US012726657B2

(12) United States Patent
Zhu

(10) Patent No.: US 12,726,657 B2
(45) Date of Patent: Sep. 1, 2026

(54) POINT CLOUD CODING AND DECODING METHODS, CODER, DECODER AND STORAGE MEDIUM

(71) Applicant: Tencent Technology (Shenzhen) Company Limited, Shenzhen (CN)

(72) Inventor: Wenjie Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 255 days.

(21) Appl. No.: 18/474,386

(22) Filed: Sep. 26, 2023

(65) Prior Publication Data

US 2024/0015325 A1 Jan. 11, 2024

Related U.S. Application Data

(63) Continuation of application No. PCT/CN2022/109518, filed on Aug. 1, 2022.

(30) Foreign Application Priority Data

Aug. 24, 2021 (CN) ......................... 202110975150.4

(51) Int. Cl.
*H04N 19/597* (2014.01)
*H04N 19/136* (2014.01)
*H04N 19/169* (2014.01)
*H04N 19/70* (2014.01)

(52) U.S. Cl.
CPC ......... *H04N 19/597* (2014.11); *H04N 19/136* (2014.11); *H04N 19/1887* (2014.11); *H04N 19/70* (2014.11)

(58) Field of Classification Search
CPC ............... H04N 19/597; H04N 19/136; H04N 19/1887; H04N 19/70; H04N 19/13;
(Continued)

(56) References Cited

U.S. PATENT DOCUMENTS

2019/0081638 A1* 3/2019 Mammou ............ H04N 19/436
2019/0116372 A1 4/2019 Cohen et al.
2020/0021856 A1 1/2020 Tourapis et al.

FOREIGN PATENT DOCUMENTS

CN 111405281 A 7/2020
CN 113014903 A 6/2021
(Continued)

OTHER PUBLICATIONS

Extended European Search Report dated Nov. 18, 2024 in application No. 22860186.0.

(Continued)

*Primary Examiner* — Maria E Vazquez Colon
(74) *Attorney, Agent, or Firm* — Sughrue Mion, PLLC

(57) ABSTRACT

A point cloud data decoding method includes decoding a first code stream of a point cloud, to obtain a residual value of first information of each point in the point cloud, the first information comprising at least one of geometry information and attribute information, acquiring the first information of a starting point in the prediction tree, and sequentially decoding, according to the arrangement sequence of the points of the point cloud in the prediction tree, the points in the point cloud based on the first information of the starting point and the residual value of the first information of each point in the point cloud, to obtain a reconstruction value of the first information of the point cloud.

20 Claims, 4 Drawing Sheets

(58) Field of Classification Search
CPC ......... H04N 19/184; G06T 9/00; G06T 9/001; G06T 9/40
See application file for complete search history.

(56) References Cited

FOREIGN PATENT DOCUMENTS

| | | | | |
|---|---|---|---|---|
| CN | 113096198 | A | 7/2021 | |
| CN | 113096199 | A | 7/2021 | |
| WO | 2020/175588 | A1 | 9/2020 | |
| WO | 2021/002665 | A1 | 1/2021 | |
| WO | WO-2022116118 | A1 * | 6/2022 | ............... G06T 9/00 |

OTHER PUBLICATIONS

Chen et al., "Hilbert Space Filling Curve Based Scan-Order for Point Cloud Attribute Compression", IEEE Transactions on Image Processing, vol. 31, 2022, pp. 4609-4621.
"Description of Core Experiment 13.26 for G-PCC: on Axis Order", ISO/IEC JTC 1/SC 29/WG 11, Coding of moving pictures and audio Convenorship: UNI (Italy), N19109, Jan. 31, 2019, 4 pages.
"G-PCC codec description v8", ISO/IEC JTC 1/SC 29/WG 11 Coding of moving pictures and audio Convenorship: JISC (Japan), N19525, Oct. 2, 2020, 140 pages.
Hur et al., "[G-PCC] [New Proposal] on re-ordering for geometry predictive tree coding", International Organisation for Standardisation Organisation Internationale De Normalisation ISO/IEC JTC 1/SC 29/WG 7 Coding of Moving Pictures and Audio, ISO/IEC JTC 1/SC 29/WG 7 m56740, Apr. 2021, 5 pages.
International Search Report for PCT/CN2022/109518 dated Nov. 2, 2022.

* cited by examiner

POINT CLOUD CODING AND DECODING METHODS, CODER, DECODER AND STORAGE MEDIUM

CROSS-REFERENCE TO RELATED APPLICATIONS

This application is a continuation application of International Application No. PCT/CN2022/109518, filed on Aug. 1, 2022, which claims priority to China Patent Application No. 202110975150.4, filed with the China National Intellectual Property Administration on Aug. 24, 2021, the disclosures of each of which being incorporated by reference herein in their entireties.

FIELD

The disclosure relates to the field of video coding and decoding technologies, and in particular, to point cloud coding and decoding methods, a coder, a decoder, and a storage medium.

BACKGROUND

An object surface is collected through an acquiring device to form point cloud data, the point data including hundreds of thousands of or even more points. In the process of video production, the point cloud data is transmitted between a video production device and a video coding device in the form of point cloud media files. However, such numerous points bring challenges to transmission, so the video production device needs to compress the point cloud data and then transmit it.

Compression of the point cloud data mainly includes compression of location information and compression of attribute information. At present, the compression method of the point cloud data is an octree-based compression method. A point cloud bounding box is evenly divided layer by layer, each node has eight child nodes, and occupancy or not of each child node of an octree is indicated by '1' or '0'.

However, the 3D location distribution of sparse point cloud data is scattered, that is, most nodes in the octree are empty, resulting in high complexity and low efficiency of octree-based coding.

SUMMARY

The disclosure provides point cloud coding and decoding methods, a coder, a decoder and a storage medium, to reduce the coding and decoding complexity of a point cloud and improving the coding and decoding efficiency.

In some embodiments, a point cloud data decoding method, performed by a computer device, the point cloud data decoding method may include:

decoding a first code stream of a point cloud, to obtain a residual value of first information of each point in the point cloud, the first information comprising at least one of geometry information and attribute information;

wherein the first code stream of the point cloud is obtained by coding the residual value of the first information of each point in the point cloud based on an arrangement sequence of points in a prediction tree, the prediction tree of the point cloud is obtained by sorting the points in the point cloud according to a target sorting method, and the target sorting method comprises at least one of a first sorting method, a second sorting method and a third sorting method, the first sorting method being a sorting method based on original coordinate information of the points, the second sorting method being a sorting method based on sizes of codewords corresponding to the points, and the third sorting method being a sorting method based on the sizes of distances between two points;

acquiring the first information of a starting point in the prediction tree; and sequentially decoding, according to the arrangement sequence of the points of the point cloud in the prediction tree, the points in the point cloud based on the first information of the starting point and the residual value of the first information of each point in the point cloud, to obtain a reconstruction value of the first information of the point cloud.

Some embodiments provide a point cloud data decoding apparatus, including at least one memory configured to store program code; and at least one processor configured to access the at least one memory and operate according to the program code, the program code may include:

decoding code configured to cause at least one of the at least one processor to decode a first code stream of a point cloud, to obtain a residual value of first information of each point in the point cloud, the first information comprising at least one of geometry information and attribute information, wherein the first code stream of the point cloud is obtained by coding the residual value of the first information of each point in the point cloud based on an arrangement sequence of points in a prediction tree of the point cloud, the prediction tree of the point cloud is obtained by sorting the points in the point cloud according to a target sorting method, and the target sorting method comprises at least one of a first sorting method, a second sorting method and a third sorting method, the first sorting method being a sorting method based on original coordinate information of the points, the second sorting method being a sorting method based on the sizes of codewords corresponding to the points, and the third sorting method being a sorting method based on the sizes of distances between two points;

acquiring code configured to cause at least one of the at least one processor to acquire the first information of a starting point in the prediction tree; and reconstruction code configured to cause at least one of the at least one processor to sequentially decode, according to the arrangement sequence of the points of the point cloud in the prediction tree, the points in the point cloud based on the first information of the starting point and the residual value of the first information of each point in the point cloud, to obtain a reconstruction value of the first information of the point cloud.

Some embodiments provide a non-transitory computer-readable storage medium storing computer code which, when executed by at least one processor, causes the at least one processor to execute the method according to some embodiments.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DETAILED DESCRIPTION

Figure 1:
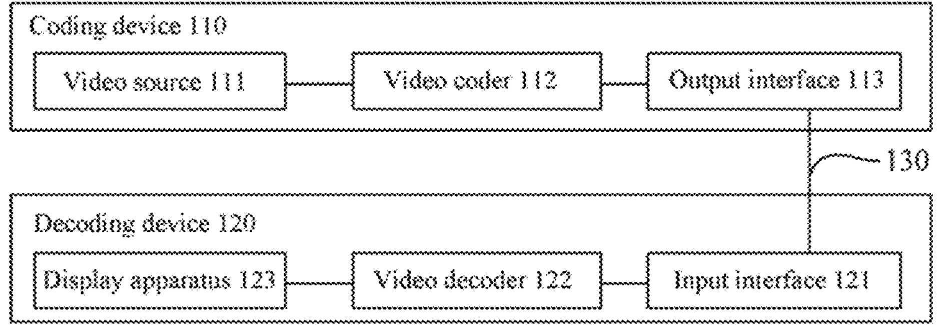
FIG. 1 is a schematic block diagram of a point cloud video coding and decoding system according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure and the appended claims.

In the following description, the terms "some embodiments" and "various embodiments" describes subsets of all possible embodiments, but it is to be understood that "some embodiments" and "various embodiments" may be the same subset or different subsets of all the possible embodiments, and can be combined with each other without conflict.

Some embodiments provide a point cloud encoding method, including acquiring a point cloud, the point cloud comprising a plurality of points; determining a target sorting method for the plurality of points in the point cloud, the target sorting method comprising at least one of a first sorting method, a second sorting method or a third sorting method, the first sorting method being a sorting method based on original coordinate information of the plurality of points, the second sorting method being a sorting method based on sizes of codewords corresponding to the plurality of points, and the third sorting method being a sorting method based on sizes of distances between two points of the plurality of points; sorting the plurality of points in the point cloud according to the target sorting method to obtain a prediction tree of the point cloud; and determining a residual value of first information of each point of the plurality of points in the point cloud according to an arrangement sequence of points in the prediction tree, the first information comprising at least one of geometry information and attribute information, and coding the residual value of the first information to obtain a first code stream of the point cloud.

Some embodiments provide a point cloud decoding method, including: decoding a first code stream of a point cloud, to obtain a residual value of first information of each point in the point cloud, the first information including at least one of geometry information and attribute information, where the first code stream of the point cloud is obtained by coding the residual value of the first information of each point in the point cloud based on an arrangement sequence of points in a prediction tree of the point cloud, the prediction tree of the point cloud is obtained by sorting the points in the point cloud according to a target sorting method, and the target sorting method includes at least one of a first sorting method, a second sorting method and a third sorting method, the first sorting method being a sorting method based on original coordinate information of the points, the second sorting method being a sorting method based on the sizes of codewords corresponding to the points, and the third sorting method being a sorting method based on the sizes of distances between two points; acquiring the first information of a starting point in the prediction tree; and sequentially decoding, according to the arrangement sequence of the points of the point cloud in the prediction tree, the points in the point cloud based on the first information of the starting point and the residual value of the first information of each point in the point cloud, to obtain a reconstruction value of the first information of the point cloud.

Some embodiments provide an encoder executing the method according to some embodiments, the encoder includes functional modules for executing the methods according to some embodiments.

Some embodiments provide a decoder executing the method according to some embodiments, the decoder includes functional modules for executing the method according to some embodiments.

Some embodiments provide a coder, including a processor and a memory. The memory is configured to store a computer program. The processor is configured to call and run the computer program stored in the memory, to execute the method according to some embodiments.

Some embodiments provide a decoder, including a processor and a memory. The memory is configured to store a computer program. The processor configured to call and run the computer program stored in the memory, to execute the method according to some embodiments.

Some embodiments provide a coding and decoding system, including the coder according to some embodiments, and the decoder according to some embodiments.

Some embodiments provide a chip for implementing the method according some embodiments. In some embodiments, the chip includes: a processor, configured to call and run a computer program from a memory, so that a device on which the chip is installed executes the method according to some embodiments.

Some embodiments provide a non-transitory computer-readable storage medium storing computer code which, when executed by at least one processor, causes the at least one processor to execute the method according to some embodiments.

Some embodiments provide a computer program product, including computer program instructions, the computer program instructions causing a computer to execute the method according to some embodiments.

Some embodiments provide a computer program, the computer program, when run on a computer, causing the computer to execute the method according to some embodiments.

According to some embodiments, the target sorting method for the points in the point cloud is determined, the target sorting method including at least one of the first sorting method, the second sorting method and the third sorting method, where the first sorting method is the sorting method based on original coordinate information of the points, the second sorting method is the sorting method based on the sizes of the codewords corresponding to the points, and the third sorting method is the sorting method based on the sizes of the distances between two points; the points in the point cloud are sorted according to the determined target sorting method, to obtain the prediction tree of the point cloud; and the residual value of the first information of each point in the point cloud is determined according to the arrangement sequence of the points in the prediction tree, and the residual value of the first information of each point in the point cloud is coded, to obtain the first code stream of the point cloud. Some embodiments provide the various sorting methods to generate the prediction tree, thereby enriching the generation methods of the prediction tree; and when the point cloud is coded according to the prediction tree generated by the foregoing method, the coding efficiency of the point cloud can be improved, and the whole coding process is simple.

Technical solutions are described below with reference to the accompanying drawings.

It is to be understood that in this specification, "B corresponding to A" means that B is associated with A. Moreover, B may be determined according to A. It is to be further understood that determining B according to A does not mean determining B only according to A, but B may also be determined according to A and/or other information.

Additionally, as used in this specification, the phrase "at least one of A and B" includes within its scope "only A", "only B" and "both A and B".

In some embodiments, "a plurality of" means two or more than two, unless otherwise specified.

In addition, in order to clearly describe technical solutions of the embodiments, the words "first" and "second" are used to distinguish the same or similar items with basically the same functions and effects. A person skilled in the art may understand that the words "first" and "second" are not limited to the quantity and execution order, and the words "first" and "second" do not mean necessarily different.

The solutions provided by some embodiments may also relate to coding and decoding standards or technologies.

The solutions provided by some embodiments may be applied to the technical field of digital video coding, for example, the field of image coding and decoding, the field of video coding and decoding, the field of hardware video coding and decoding, the field of special circuit video coding and decoding, or the field of real-time video coding and decoding. In some embodiments, the solutions may be combined to an audio video coding standard (AVS), a second generation AVS (AVS2) or a third generation AVS (AVS3), including but not limited to an H.264/audio video coding (AVC) standard, an H.265/high efficiency video coding (HEVC) standard and an H.266/versatile video coding (VVC) standard. In other words, the solutions provided by some embodiments may be combined with other exclusive or industrial standards, for example, ITU-TH.261, ISO/IECMPEG-1Visual, ITU-TH.262 or ISO/IECMPEG-2Visual, ITU-TH.263, ISO/IECMPEG-4Visual, ITU-TH.264 (also referred to as ISO/IECMPEG-4AVC), and/or scalable video codec (SVC) and multi-view video codec (MVC) extensions.

In addition, the solutions provided by some embodiments may be used for performing lossy compression on images, and may also be used for performing lossless compression on images. The lossless compression may be visually lossless compression, and may also be mathematically lossless compression.

The solutions provided by some embodiments may also relate to the field of vehicle-mounted technologies.

In some embodiments, a client may be a user terminal. In some embodiments, the user terminal includes but is not limited to a mobile phone, a computer, an intelligent voice interaction device, an intelligent household electrical appliance, a vehicle-mounted terminal, an aircraft or the like.

For ease of understanding, relevant concepts involved in some embodiments are described below first.

A point cloud refers to a set of discrete points which are irregularly distributed in space and express the spatial structure and surface properties of a 3D object or 3D scene.

Point cloud data is the specific record form of the point cloud. Points in the point cloud may include location information of the points and attribute information of the points. For example, the location information of the point may be three-dimensional coordinate information of the point. The location information of the point may also be called geometry information of the point. For example, the attribute information of the point may include color information and/or reflectivity, and so on. For example, the color information may be information in any color space. For example, the color information may be RGB. For another example, the color information may be luminance and chroma (YcbCr, YUV) information. For example, Y represents luminance (Luma), Cb(U) represents blue chromatic aberration, Cr(V) represents red, U and V represent chroma used for describing chromatic aberration information. For example, the points in the point cloud obtained according to a laser measurement principle may include three-dimensional coordinate information of the points and laser reflectance of the points. For another example, the points in the point cloud obtained according to a photogrammetry principle may include the three-dimensional coordinate information of the points and color information of the points. For another example, the points in the point cloud obtained according to a combination of the laser measurement principle and the photogrammetry principle may include the three-dimensional coordinate information of the points, the laser reflectance of the points, and the color information of the points.

Acquiring ways of the point cloud data may include, but is not limited to, at least one of the following: (1) Generation by a computer device. The computer device may generate point cloud data according to a virtual three-dimensional object and a virtual three-dimensional scene. (2) Three-dimensional (3D) laser scanning. Point cloud data of a three-dimensional object or three-dimensional scene in the static real world may be acquired by 3D laser scanning, and millions of point cloud data may be obtained every second. (3) 3D photogrammetry. Point cloud data of a visual scene in the real world may be obtained by collecting the visual scene in the real world through a 3D photography device (that is, a group of cameras or a camera device with a plurality of lenses and sensors), and the point cloud data of a three-dimensional object or a three-dimensional scene in the dynamic real world may be obtained through 3D photography. (4) Acquisition of point cloud data of biological tissues and organs through a medical device. In the field of medicine, point cloud data of the biological tissues and organs may be obtained through the medical device such as magnetic resonance imaging (MRI), computed tomography (CT) and electromagnetic positioning information.

According to the acquisition ways, the point clouds may be divided into: dense point clouds and sparse point clouds.

According to timing sequence types of data, the point clouds may be divided into:

First static point clouds: that is, objects are static, and devices for acquiring the point clouds are also static;

Second-class dynamic point clouds: objects are movable, but devices for acquiring the point clouds are static;

Third-class dynamically acquired point clouds: devices for acquiring the point clouds are movable.

According some embodiments, the point clouds are divided into two categories:

Category I: Machine perceivable point clouds, which may be applied to scenes, such as autonomous navigation systems, real-time inspection systems, geographic information systems, visual sorting robots, rescue robots.

Category II: Human eye perceivable point clouds, which may be applied to digital cultural heritage, free viewpoint broadcasting, three-dimensional immersive communication, three-dimensional immersive interaction and other point cloud application scenes.

FIG. 1 is a schematic block diagram of a point cloud video coding and decoding system according to some embodiments. FIG. 1 is only an example. The point cloud video coding and decoding system includes but is not limited to that shown in FIG. 1. As shown in FIG. 1, a point cloud video coding and decoding system 100 includes a coding device 110 and a decoding device 120. The coding device 110 is configured to code (which may be understood as compressing) point cloud data to generate a code stream, and transmit the code stream to the decoding device 120. The decoding device 120 decodes the code stream generated by the coding device 110, to obtain decoded point cloud data.

The coding device 110 according to some embodiments may be understood as a device with a video coding function, and the decoding device 120 may be understood as a device with a video decoding function. That is, the coding device 110 and the decoding device 120 according to some embodiments include a wider range of apparatuses, including, for example, smart phones, desktop computers, mobile computing devices, notebook computers (e.g., laptop computers), tablet computers, set-top boxes, televisions, cameras, display apparatuses, digital media players, video game consoles, on board computers, etc.

In some embodiments, the coding device 110 may transmit the coded point cloud data (such as the code stream) to the decoding device 120 via a channel 130. The channel 130 may include one or more media and/or apparatuses that can transmit the coded point cloud data from the coding device 110 to the decoding device 120.

In some embodiments, the channel 130 includes one or more communication media that cause the coding device 110 to be able to directly transmit the coded point cloud data to the decoding device 120 in real time. In this example, the coding device 110 may modulate the coded point cloud data according to communication standards, and transmit modulated point cloud data to the decoding device 120. The communication media include wireless communication media, such as, radio frequency spectrum. In some embodiments, the communication media may further include wired communication media, such as one or more physical transmission lines.

In another example, the channel 130 includes a storage medium. The storage medium may store the point cloud data coded by the coding device 110. The storage medium includes a variety of local access data storage mediums, such as optical disks, DVD, flash memories, etc. In this example, the decoding device 120 may acquire the coded point cloud data from the storage medium.

In another example, the channel 130 may include a storage server. The storage server may store the point cloud data coded by the coding device 110. In this example, the decoding device 120 may download the coded point cloud data stored in the storage server. In some embodiments, the storage server may store the coded point cloud data, and may transmit the coded point cloud data to the decoding device 120, such as a web server (e.g., for a website), a file transmission protocol (FTP) server.

In some embodiments, the coding device 110 includes a video coder 112 and an output interface 113. The output interface 113 may include a modulator/demodulator (modem) and/or a transmitter.

In some embodiments, the coding device 110 may include a video source 111 in addition to the video coder 112 and the output interface 113.

The video source 111 may include at least one of a video acquisition apparatus (for example, a video camera), a video archive, a video input interface, and a computer graphics system, where the video input interface is configured to receive point cloud data from a video content provider, and the computer graphics system is configured to generate point cloud data.

The video coder 112 codes the point cloud data from the video source 111, to generate the code stream. The video coder 112 directly/indirectly transmits the coded point cloud data to the decoding device 120 via the output interface 113. The coded point cloud data may further be stored on the storage medium or storage server, to be subsequently read by the decoding device 120.

In some embodiments, the decoding device 120 includes an input interface 121 and a video decoder 122.

In some embodiments, the decoding device 120 may further include a display apparatus 123 in addition to the input interface 121 and the video decoder 122.

The input interface 121 includes a receiver and/or a modem. The input interface 121 may receive the coded point cloud data through the channel 130.

The video decoder 122 is configured to decode the coded point cloud data, to obtain decoded point cloud data, and transmitting the decoded point cloud data to the display apparatus 123.

The display apparatus 123 displays the decoded point cloud data. The display apparatus 123 may be integrated with the decoding device 120 or outside the decoding device 120. The display apparatus 123 may include various display apparatuses, such as liquid crystal displays (LCD), plasma displays, organic light emitting diode (OLED) displays or other types of display apparatuses.

The technical solutions according to some embodiments are not limited to FIG. 1. In some embodiments, the technology may also be applied to unilateral video coding or unilateral video decoding.

Since the point cloud is a collection of massive points, storing the point cloud not only consumes a large amount of memory, but also is not conducive to transmission, and there is no such a large bandwidth to support direct transmission of the point cloud in a network layer without compression, so it is necessary to compress the point cloud.

Up to now, the point cloud may be compressed through a point cloud coding framework.

The point cloud coding framework may be a geometry point cloud compression (G-PCC) coding and decoding framework or a video point cloud compression (V-PCC) coding and decoding framework provided by a moving picture experts group (MPEG), and may also be an audio video standard point cloud compression (AVS-PCC) coding and decoding framework provided by an audio video standard organization. G-PCC and AVS-PCC are both aimed at static sparse point clouds, and coding frameworks thereof are basically the same. The G-PCC coding and decoding framework may be used for compressing the first static point clouds and the third-class dynamically acquired point clouds, and the V-PCC coding and decoding framework are used for compressing the second-class dynamic point clouds. The G-PCC coding and decoding framework is also called a point cloud codec TMC13, and the V-PCC coding and decoding framework is also called a point cloud codec TMC2.

The coding and decoding framework applicable to some embodiments is described below by taking the G-PCC coding and decoding framework as an example.

Figure 2:
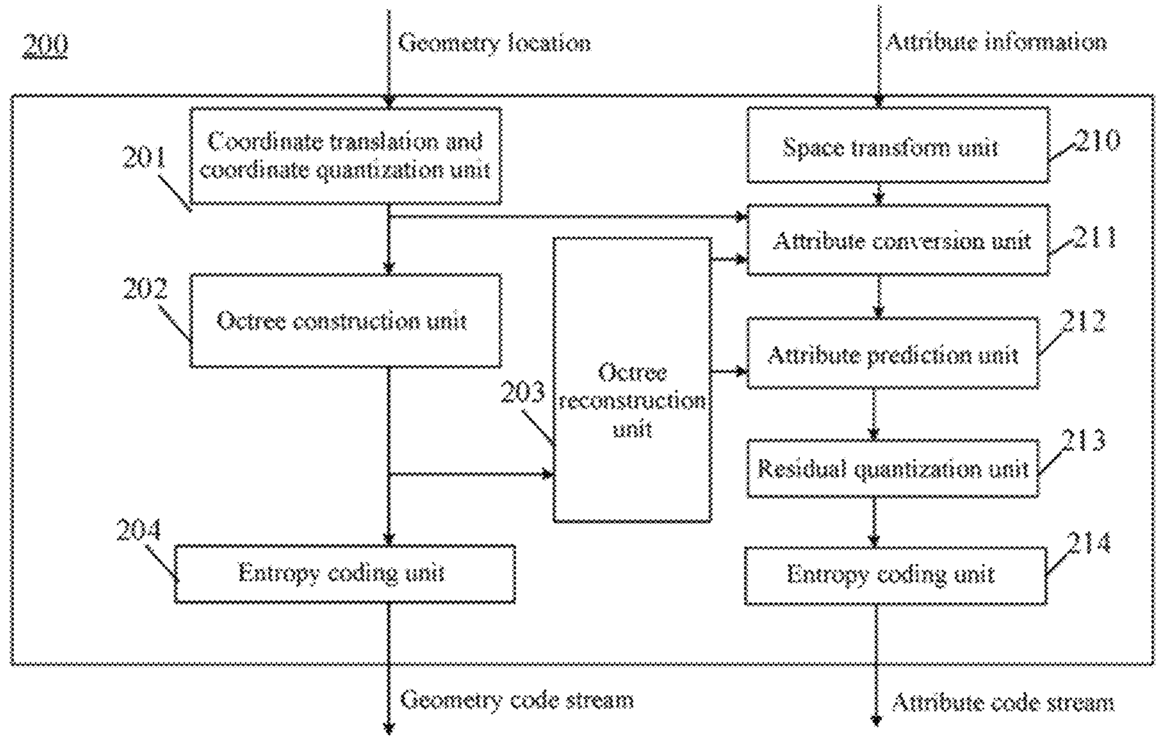
FIG. 2 is a schematic block diagram of a coding frame according to some embodiments.

FIG. 2 is a schematic block diagram of a coding framework according to some embodiments.

As shown in FIG. 2, a coding framework 200 may acquire location information (also called geometry information or geometry location) and attribute information of a point cloud from an acquiring device. Coding of the point cloud includes location coding and attribute coding.

A location coding process includes: Perform coordinate transform, quantitative removal of duplicate points and other preprocessing on the original point cloud. Construct an octree, and then perform coding to form a geometry code stream.

An attribute coding process includes: Select one of three prediction modes to perform point cloud prediction according to reconstruction information of the location information and a true value of the attribute information of the given input point cloud, quantize a prediction result, and perform arithmetic coding to form an attribute code stream.

As shown in FIG. 2, location coding may be implemented through the following units:

A coordinate translation and coordinate quantization unit 201, an octree construction unit 202, an octree reconstruction unit 203, and an entropy coding unit 204.

The coordinate translation and coordinate quantization unit 201 may be configured to transform world coordinates of each point in the point cloud into relative coordinates, and quantizing the coordinates, which may reduce the quantity of the coordinates. After quantization, points that are different originally may be endowed with the same coordinates.

The octree construction unit 202 may code the quantized location information of the points using an octree coding method. In some embodiments, the point cloud is divided according to the form of an octree, so that locations of the points may correspond to locations in the octree one by one. By counting the locations of the points in the octree, and recording flags thereof as 1, geometry coding is performed.

The octree reconstruction unit 203 is configured to reconstruct the geometry location of each point in the point cloud, to obtain a reconstructed geometry location of the point.

The entropy coding unit 204 may perform arithmetic coding in an entropy coding mode on the location information outputted by the octree construction unit 202, that is, the location information outputted by the octree construction unit 202 is formed into a geometry code stream using an arithmetic coding method. The geometry code stream is also called a geometry bit stream.

Attribute coding may be implemented through the following units:

A space transform unit 210, an attribute conversion unit 211, an attribute prediction unit 212, a residual quantization unit 213 and an entropy coding unit 214.

The space transform unit 210 may be configured to transform an RGB color space of each point in the point cloud into a YCbCr format or other formats.

The attribute conversion unit 211 may be configured to convert, attribute information of each point in the point cloud, to minimize attribute distortion. In some embodiments, the attribute conversion unit 211 may be configured to obtain a true value of the attribute information of the point. In some embodiments, the attribute information may be color information of the point.

The attribute prediction unit 212 may be configured to predict the attribute information of each point in the point cloud, to obtain a prediction value of the attribute information of the point, and then obtaining a residual value of the attribute information of the point based on the prediction value of the attribute information of the point. In some embodiments, the residual value of the attribute information of the point may be the true value of the attribute information of the point minus the prediction value of the attribute information of the point.

The residual quantization unit 213 may be configured to quantize the residual value of the attribute information of the point.

The entropy coding unit 214 may perform entropy coding on the residual value of the attribute information of the point using zero run length coding, to obtain the attribute code stream. The attribute code stream may be bit stream information.

Referring to FIG. 2, the main operations and processing of geometry coding in some embodiments are as follows:

(1) Pre-processing: Include transforming coordinates and voxelizing. Through scaling and translation operations, the point cloud data in a 3D space is transformed into an integer form, and moving the minimum geometry location thereof to a coordinate origin.

(2) Geometry coding: Geometry coding includes two modes, which may be used under different conditions.

(A) Octree-based geometry coding: An Octree is a tree-like data structure. In 3D space division, a preset bounding box is uniformly divided, and each node has eight child nodes. By using '1' and '0' to indicate occupancy or not of each child node of the octree, occupancy code information is obtained as a code stream of the geometry information of the point cloud.

(B) Triangular representation-based geometry coding (Trisoup): The point cloud is divided into blocks with a certain size, intersections of the surface of the point cloud on the edges of the blocks are positioned, and triangles are constructed. Compression of the geometry information is achieved by coding the locations of the intersections.

(3) Geometry quantization: The fineness of quantization is usually determined by a quantization parameter (QP). The larger the value of QP is, the coefficients representing a larger range of values may be quantized into the same output, which usually leads to greater distortion and a lower code rate. On the contrary, the smaller the value of QP is, the coefficients representing a smaller range of values may be quantized into the same output, which usually leads to smaller distortion and meanwhile corresponds to a higher code rate. In point code coding, quantization is directly performed on the coordinate information of the points.

(4) Geometry entropy coding: Perform statistic compression coding on the occupancy code information of the octree, and finally output a binary (0 or 1) compressed code stream. Statistic coding is a lossless coding method, which can effectively reduce a bit rate required to express the same signal. A common statistic coding method is content adaptive binary arithmetic coding.

The main operations and processing of attribute information coding are as follows:

(1) Attribute recoloring: In the case of lossy coding, after the geometry information is coded, a coder side needs to decode and reconstruct the geometry information, that is, recover the coordinate information of each point in the 3D point cloud. The attribute information corresponding to one or more adjacent points are searched in the original point cloud, to serve as the attribute information of this reconstructed point.

(2) Attribute prediction coding: during attribute prediction coding, one or more points are selected as predilection values according to the proximity relationship of the geometry information or attribute information, and a final attribute prediction value is obtained by finding a weighted average of the prediction values, and the difference between the true value and the prediction value is coded.

(3) Attribute transform coding: Attribute transform coding includes three modes, which may be used under different conditions.

(a) Predicting transform coding: A point subset is selected according to distances, and the point cloud is divided into a plurality of different levels of detail (LoD), achieving point cloud representation from rough to fine. Prediction from the bottom up may be realized between the adjacent layers, that is, the adjacent point in the rough layer predicts the attribute information of the point introduced into the fine layer, to obtain a corresponding residual signal. The point at the bottommost layer is used as reference information for coding.

(b) Lifting transform coding: On the basis of LoD adjacent layer prediction, a weight update strategy for neighborhood points is introduced to finally obtain the predicted attribute value of each point, so as to obtain a corresponding residual signal.

(c) Region adaptive hierarchical transform (RAHT) coding: RAHT is performed on the attribute information to transform the signal into a transform domain, which is called a transform coefficient.

(4) Attribute information quantization: The fineness of quantization is usually determined by the quantization parameter (QP). During predicting transform coding and lifting transform coding, the residual value is quantized and then subjected to entropy coding. In RAHT, the transform coefficient is quantized and then subjected to entropy coding.

(5) Attribute entropy coding: Final compression of the quantized attribute residual signal or transform coefficient is generally realized through run length coding and arithmetic coding. The information such as a corresponding coding mode and the quantization parameter is also coded by an entropy coder.

Figure 3:
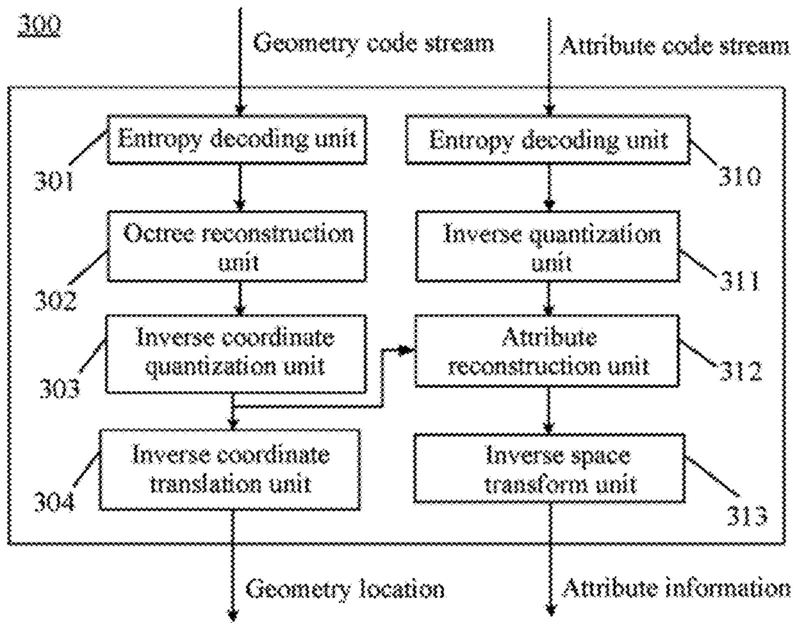
FIG. 3 is a schematic block diagram of a decoding framework according to some embodiments.

FIG. 3 is a schematic block diagram of a decoding framework according to some embodiments.

As shown in FIG. 3, a decoding framework 300 may acquire a code stream of a point cloud from a coding device, and obtain location information and attribute information of points in the point cloud by parsing the code stream. Decoding of the point cloud includes location decoding and attribute decoding.

A location decoding process includes: Perform arithmetic decoding on a geometry code stream. Construct an octree and then combine, reconstruct the location information of the point, to obtain reconstruction information of the location information of the point. Perform coordinate transform on the reconstruction information of the location information of the point, to obtain the location information of the point. The location information of the point may also be called geometry information of the point.

An attribute decoding process includes: Acquire a residual value of the attribute information of each point in the point cloud by parsing an attribute code stream. Inversely quantize the residual value of the attribute information of the point, to obtain the residual value of the attribute information of the inversely quantized point. Select, based on the reconstruction information of the location information of the points obtained during the location decoding process, one of three prediction modes to perform point cloud prediction, so as to obtain a reconstruction value of the attribute information of the points. Perform reverse color space transform on the reconstruction value of the attribute information of the points, to obtain a decoded point cloud.

As shown in FIG. 3, location decoding may be implemented through the following units:

An entropy decoding unit 301, an octree reconstruction unit 302, an inverse coordinate quantization unit 303 and an inverse coordinate translation unit 304.

Attribute coding may be implemented through the following units:

An entropy decoding unit 310, an inverse quantization unit 311, an attribute reconstruction unit 312 and an inverse space transform unit 313.

Decompression is an inverse process of compression. Similarly, the functions of the units in the decoding framework 300 may refer to the functions of the corresponding units in the coding framework 200.

At a decoder side, after a decoder acquires a compressed code stream, entropy decoding is first performed to obtain various kinds of mode information, as well as quantized geometry information and attribute information. Firstly, the geometry information is inversely quantized to obtain reconstructed 3D point location information. On the other hand, the attribute information is inversely quantized to obtain residual information, and a reference signal is confirmed according to a used transform mode to obtain reconstructed attribute information, which sequentially corresponds to the geometry information one by one in order to generate outputted reconstructed point cloud data.

In some embodiments, the decoding framework 300 may divide the point cloud into a plurality of LoDs according to Euclidean distances between points in the point cloud; and then, sequentially decode the attribute information of the points in the LoDs. In some embodiments, calculate the count of zero (zero_cut) in a zero run length coding technology, to obtain the residual value by decoding based on the zero_cut. Then, the decoding framework 300 may perform inverse quantization based on the decoded residual value, and add a prediction value of the current point based on the inversely quantized residual value to obtain a reconstruction value, until all the points are decoded. The current point may be used as the closest neighbor of the point in the subsequent LoD, and use the reconstruction value of the current point to predict the attribute information of the subsequent point.

The related technologies involved in some embodiments are introduced below.

1. Processing

Determine an origin and sizes of a bounding box

Coordinates of a $k^{th}$ point of a floating point type of an input point cloud are represented as $(x^k, y^k, z^k)$, k=0, . . . , K−1, K being the quantity of the points in the point cloud, coordinate points $(x^{min}, y^{min}, z^{min})$) and $(x^{max}, y^{max}, z^{max})$) are represented as follows:

$$x^{min} = \min(x^0, x^1, \ldots, x^{K-1});$$
$$y^{min} = \min(y^0, y^1, \ldots, y^{K-1});$$
$$z^{min} = \min(z^0, z^1, \ldots, z^{K-1});$$
$$x^{max} = \max(x^0, x^1, \ldots, x^{K-1});$$
$$y^{max} = \max(y^0, y^1, \ldots, y^{K-1});$$
$$z^{max} = \max(z^0, z^1, \ldots, z^{K-1}).$$

The functions $\min(S^0, S^1, \ldots, S^{K-1})$ and $\max(S^0, S^1, \ldots, S^{K-1})$ represent taking the minimum value and the maximum value of current input.

Figure 4:
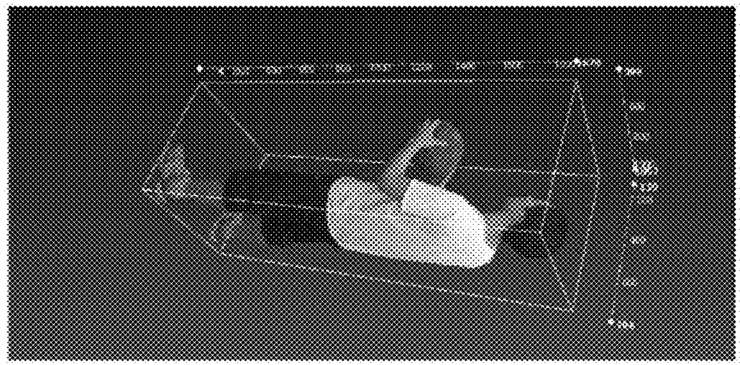
FIG. 4 is a schematic diagram of a point cloud bounding box according to some embodiments.

As shown in FIG. 4 below, the bounding box represents the largest cuboid containing all the points in the input point cloud.

The origin of the bounding box $(x^{origin}, y^{origin}, z^{origin})$ may be calculated as follows:

$$x^{origin} = \mathrm{int}(\mathrm{floor}(x^{min}));$$
$$y^{origin} = \mathrm{int}(\mathrm{floor}(y^{min}));$$
$$z^{origin} = \mathrm{int}(\mathrm{floor}(z^{min})).$$

The sizes of the bounding box in x, y and z directions may be calculated as follows:

$$\mathrm{BoundingBoxSize\_x} = \mathrm{int}(x^{max} - x^{origin}) + 1;$$
$$\mathrm{BoundingBoxSize\_y} = \mathrm{int}(y^{max} - y^{origin}) + 1;$$
$$\mathrm{BoundingBoxSize\_z} = \mathrm{int}(z^{max} - z^{origin}) + 1.$$

Int(s) is an integer function, and the floor(s) function returns the largest integer value less than or equal to s.

2. Octree-Based Coding

Figure 5:
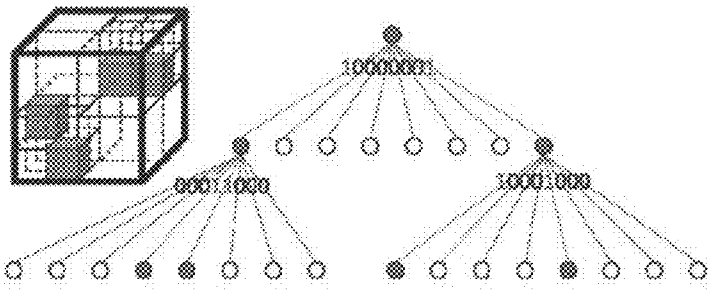
FIG. 5 is a schematic diagram of octree-based coding according to some embodiments.

An octree is a tree-like data structure. At present, an octree structure is mainly used for dividing a point cloud in G-PCC or AVS-PCC. For point cloud data in 3D space, an octree-based division method is to divide a preset bounding box evenly layer by layer, and each node has eight child nodes. By using '1' and '0' to indicate occupancy or not of each child node of the octree, as shown in FIG. 5, occupancy code information is obtained as a code stream of geometry information of the point cloud.

Octree construction is implemented based on a Morton order, that is, 3D coordinate information of the point cloud data is converted into corresponding Morton codes by querying a Morton order table. Corresponding points of each layer of the octree are obtained according to the order of Morton codes. A current mainstream point cloud coding technology uses octree-based division to represent the point cloud data, and adopts different processing flows to the geometry information and attribute information.

3. TSP (Traveling Salesman Problem)

A TSP is a classical combinatorial optimization problem. The classical TSP may be described as: A commodity salesman wants to go to several cities to sell goods. The salesman starts from one city and needs to go through all the cities before returning to the point of departure. How to choose a travel route to make a total trip shortest. From the perspective of graph theory, the essence of this problem is to find a loop with a minimum weight in a completely undirected weighted graph. Because a feasible solution of this problem is the complete arrangement of all vertexes, with increase of the quantity of the vertexes, a combination explosion will occur, which is a NP-complete problem. Because of wide application of this problem in the fields of transportation, circuit board design and logistics distribution, scholars at home and abroad have conducted a lot of research on it. Early researchers used accurate algorithms to solve this problem, and common methods include: a branch and bound method, a linear programming method, a dynamic programming method, etc. However, with increase of the scale of the problem, the accurate algorithms become powerless. Therefore, in later research, scholars at home and abroad mainly use approximate algorithms or heuristic algorithms, mainly including a genetic algorithm, a simulated annealing algorithm, an ant colony algorithm, a tabu search algorithm, a greedy algorithm and a neural network.

In some embodiments, the TSP is modeled using an undirected weighted graph, so the cities are vertexes of the graph, roads are edges of the graph, and the lengths of the roads are the lengths of the edges. This is a minimization problem that a starting point and a terminal point are at the specific vertex, and each vertex is visited exactly once. Generally, this model is a complete graph (that is, each pair of vertexes is connected by one edge). If there is no path between two cities, the graph may be completed by adding a very long edge without affecting the calculation of an optimal loop.

In a symmetric TSP, round-trip distances between two cities are the same, forming an undirected graph. This symmetry reduces the quantity of solutions in half. In an assymetric TSP, not all paths are bidirectional, or round-trip distances between two cities are different, forming a directed graph. Traffic accidents, one-way streets and the differences between the prices of air ticket to and from some cities are all examples of breaking this symmetry.

4. Prediction Coding Technology

Embodiments provide a TSP-based point cloud information prediction method, which uses the TSP to generate the prediction relationship between corresponding signals. All points are linked into a single prediction tree, and each point is predicted based on a signal value of the previous point thereof. As an option of point cloud signal prediction, this method may be set to act on whole original point cloud data, and may also act on octree child nodes or point cloud data subsets obtained by other methods.

In addition, an existing prediction coding technology in G-PCC searches using distances between points to construct the prediction tree. Each point is connected to other points, and indicates the quantity of the points linked to the point and one of four prediction modes. The prediction modes are as follows:

1) No prediction.
2) Prediction using a parent point, that is, the previous point.
3) Prediction using a parent point and a grandparent point.
4) Prediction using parent, grandparent and grand-grand-parent points.

At present, octree-based occupation information coding is still used in geometry coding. The 3D location distribution of sparse point cloud data is scattered, so octree-based coding is relatively low in efficiency, and most nodes are empty, resulting in high complexity and low efficiency of octree-based coding.

In order to solve the foregoing technical problems, a target sorting method for points in a point cloud is determined, and the points in the point cloud are sorted according to the target sorting method to obtain a prediction tree of the point cloud. According to an arrangement sequence of the points in the prediction tree, a residual value of first information of each point in the point cloud is coded to obtain a first code stream of the point cloud, where the target sorting method includes at least one of a first sorting method, a second sorting method and a third sorting method, the first sorting method being a sorting method based on original coordinate information of the points, the second sorting method being a sorting method based on the sizes of codewords corresponding to the points, and the third sorting method being a sorting method based on the sizes of distances between two points. That is, some embodiments can improve the coding efficiency of the point cloud by proposing the various point cloud sorting methods.

The technical solution of some embodiments is described in detail below.

Firstly, taking a coder side as an example, a point cloud coding method provided in some embodiments is described.

Figures 6, 7, 8:
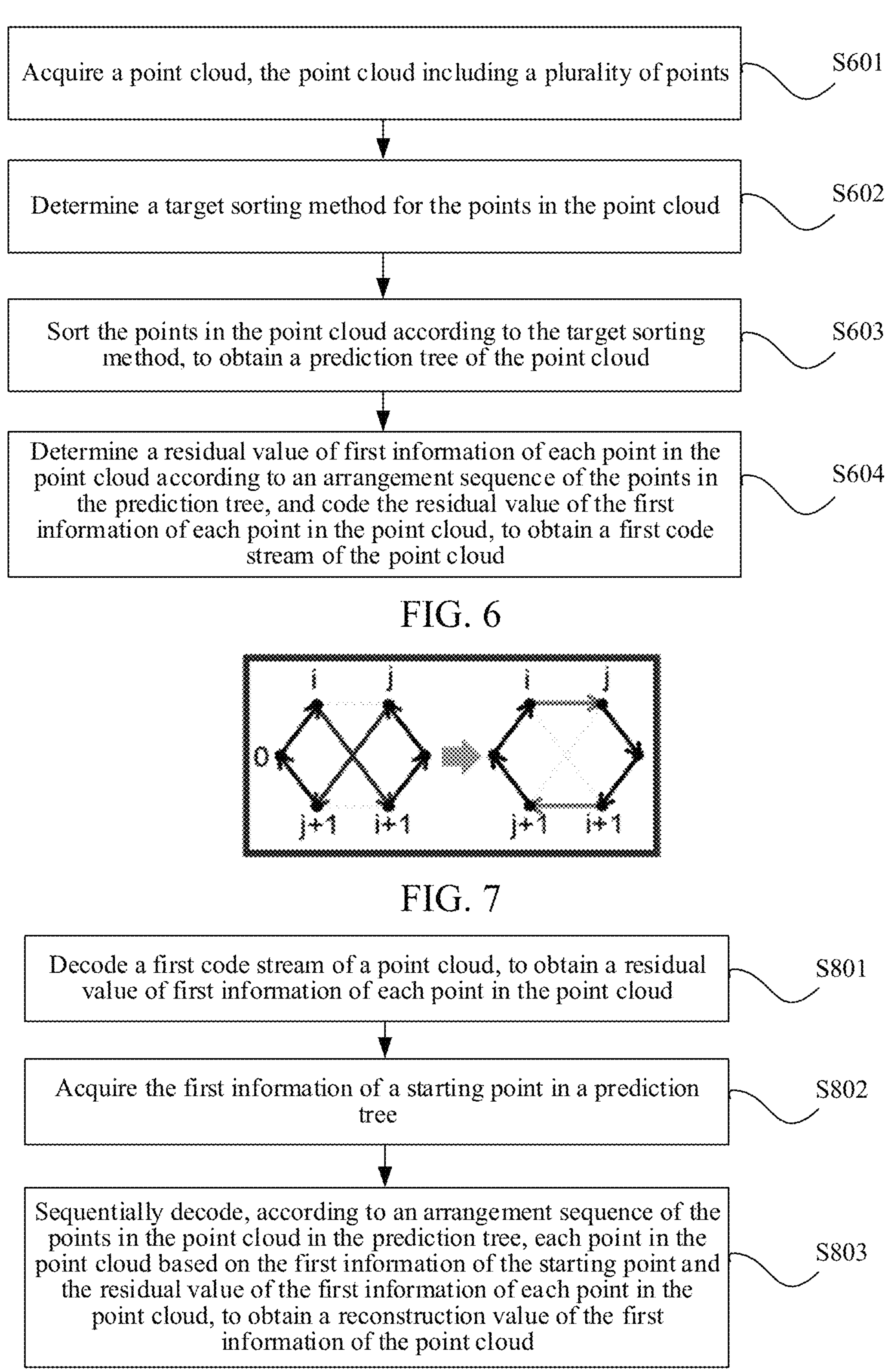
FIG. 6 is a flowchart of a point cloud coding method according to some embodiments.
FIG. 7 is a schematic diagram of location adjustment of points on a prediction tree according to some embodiments.
FIG. 8 is a flowchart of a point cloud decoding method according to some embodiments.

FIG. 6 is a flowchart of a point cloud coding method according to some embodiments. An execution subject of this method is a coding device, and the coding device is also called a coder. As shown in FIG. 6, the method includes the following operations:

S601: Acquire a point cloud, the point cloud including a plurality of points.

The solution shown in some embodiments may be used as an option of point cloud signal prediction, may be set to act on the whole point cloud, and may also act on a partial point cloud obtained by an octree or other methods, such as a subset of the whole point cloud.

The video coding device may acquire the point cloud according to the following methods:

The first method: if the video coding device has a point cloud acquiring function, the point cloud may be acquired by the video coding device.

The second method: if the point cloud is acquired by the video coding device from other storage devices, in some embodiments, a point cloud acquiring device stores the acquired point cloud into a storage device, and the video coding device reads the point cloud from the storage device.

The third method: if the point cloud is acquired by the video coding device from a point cloud acquiring device, in some embodiments, the point cloud acquiring device transmits the acquired point cloud to the video coding device.

If the foregoing point cloud is a whole point cloud, the video coding device acquires the whole point cloud through the foregoing methods as a research object of some embodiments for subsequent coding operations.

If the foregoing point cloud is a partial point cloud, the foregoing video coding device divides the whole point cloud acquired through the foregoing methods to obtain the partial point cloud. In some embodiments, the video coding device divides the whole point cloud using an octree-based method, and the partial point cloud corresponding to one node in an octree as the research object of some embodiments for subsequent coding operations.

S602: Determine a target sorting method for the points in the point cloud.

The target sorting method includes one of a first sorting method, a second sorting method and a third sorting method, the first sorting method being a sorting method based on original coordinate information of the points, the second sorting method being a sorting method based on the sizes of codewords corresponding to the points, and the third sorting method being a sorting method based on the sizes of distances between two points.

In an example, when the original coordinate information is a coordinate value, the first sorting method is a sorting method based on the sizes of the coordinate values.

In an example, the target sorting method includes any one of the first sorting method, the second sorting method and the third sorting method.

In an example, the target sorting method includes any two of the first sorting method, the second sorting method and the third sorting method.

In an example, the target sorting method includes the first sorting method, the second sorting method and the third sorting method.

The first sorting method is a method to sort the points in the point cloud based on the size of the original coordinate information of each point in the point cloud. In some embodiments, the points in the point cloud are sorted in an order from large to small or from small to large according to the size of the original coordinate information of each point in the point cloud.

The second method is a method to sort the points in the point cloud based on the size of the codeword corresponding to each point in the point cloud. In some embodiments, the codeword corresponding to each point in the point cloud is determined according to the original coordinate information of each point in the point cloud. In some embodiments, a Morton code corresponding to each point in the point cloud is determined according to the original coordinate information of each point in the point cloud. Then, the points in the point cloud are sorted according to the size of the codeword corresponding to each point in the point cloud. In some embodiments, the points in the point cloud are sorted in an order from large to small or from small to large according to the size of the codeword corresponding to each point in the point cloud.

The third sorting method is a method to sort the points in the point cloud based on the sizes of the distances between two points in the point cloud. In some embodiments, for each point in the point cloud, the distances between a point 1 and other points in the point cloud are calculated, and a point 2 closest to the point 1 is determined as the next point of the point 1. Then, the distances between the point 2 and residual points in the point cloud are calculated, and a point 3 closes to the point 2 is determined as the next point of the point 2 and so on, until all points in the point cloud are calculated.

S603: Sort the points in the point cloud according to the target sorting method, to obtain a prediction tree of the point cloud.

After the target sorting method for the points in the point cloud is determined according to the foregoing operations, the points in the point cloud are sorted according to the target sorting method, to obtain the prediction tree of the point cloud. The prediction tree may be understood as a coding order of the points in the point cloud.

In some embodiments, if the target sorting method is any one of the first sorting method, the second sorting method and the third sorting method, S603 includes:

S603-A: Sort the points in the point cloud according to any one of the first sorting method, the second sorting method and the third sorting method, to obtain the prediction tree of the point cloud.

In some embodiments, if the target sorting method includes the first sorting method and the third sorting method, the foregoing operation S603 includes:

S603-B: Sort the points in the point cloud according to the first sorting method to obtain a first order of the point cloud, and then further sort the point cloud in the first order according to the third sorting method, to obtain the prediction tree of the point cloud.

In some embodiments, if the target sorting method includes the second sorting method and the third sorting method, the foregoing operation S603 includes:

S603-C: Sort the points in the point cloud according to the second sorting method to obtain a second order of the point cloud, and further sort the point cloud in the second order according to the third sorting method, to obtain the prediction tree of the point cloud.

The first sorting method, the second sorting method and the third sorting method are described in detail below.

In some embodiments, if the target sorting method includes the first sorting method, sorting the points in the point cloud according to the first sorting method to obtain the first order of the point cloud in the foregoing operation S603-B includes but is not limited to the following several methods:

The first method: Determine an input sequence of the points in the point cloud as the first order of the points in the point cloud. That is, in this method, the points in the point cloud are not additionally sorted, and the input sequence of the point cloud is used as the first order.

The second method: Determine priorities of coordinate axes, and sort the points in the point cloud according to the priorities of the coordinate axes and the original coordinate information of each point in the point cloud, to obtain the first order of the point cloud.

For a 3D point cloud, the coordinates thereof are represented by x, y and z. The priorities of the coordinate axes are determined, in some embodiments, the priorities of the coordinate axes from high to low is xyz, that is, the priority of the x axis is higher than that of the y axis, the priority of the y axis is higher than that of the z axis, or xzy. Or, the priorities of the coordinate axes from high to low is yzx, yxz, zxy or zyx. When sorting, the points are sorted according to the sizes of coordinate values thereof on the coordinate axis with the highest priority, then the points are sorted, when the coordinate values thereof on the coordinate axis with the highest priority are the same, according to the sizes of the coordinate values thereof on the coordinate axis with the second highest priority, and then the points are sorted, when the coordinate values thereof on the coordinate axis with the second highest priority are the same, according to the sizes of the coordinate values thereof on the coordinate axis with the lowest priority.

In some embodiments, the implementation of determining the priorities of the coordinate axes includes but is not limited to the following several methods:

The first method: Determine default priorities as the priorities of the coordinate axes. In some embodiments, the priorities of the coordinate axes from high to low are xyz by default.

The second method: Determine the priorities of the first coordinate axis, the second coordinate axis and the third coordinate axis to be the same.

The third method: Determine priorities specified by the coding device as the priorities of the coordinate axes. In some embodiments, the priorities, specified by the coding device, of the coordinate axes from high to low are zyx.

The fourth method: Determine the priorities of the coordinate axes according to data distribution density of each point in the point cloud on each coordinate axis. In some embodiments, the data distribution density of each point in the point cloud on the second coordinate axis is greater than the data distribution density on the first coordinate axis, and the data distribution density on the first coordinate axis is greater than the data distribution density on the third coordinate axis, so it is determined that the priority of the second coordinate axis is higher than the priority of the first coordinate axis, the priority of the first coordinate axis is higher than the priority of the third coordinate axis, that is, the priorities of the three coordinate axes from high to low are: the second coordinate axis, the first coordinate axis and the third coordinate axis.

The second coordinate axis, the first coordinate axis and the third coordinate axis mat be coordinate axes in an xyz coordinate system, and may also be r, ρ and φ coordinate axes of a polar coordinate system to which the xyz coordinate system is converted.

In some embodiments, if the priorities of the coordinate axes from large to small are the first coordinate axis, the second coordinate axis and the third coordinate axis in sequence, sorting the points in the point cloud according to the priorities of the coordinate axes and the original coordinate information of each point in the point cloud in the foregoing second method includes the following operations S603-B1 to S603-B3:

S603-B1: Sort the points in the point cloud according to the sizes of the original coordinate information of the points on the first coordinate axis.

S603-B2: For the points of which the original coordinate information on the first coordinate axis is the same, sort the points of which the original coordinate information on the first coordinate axis is the same according to the sizes of the original coordinate information of the points on the second coordinate axis.

S603-B3: For the points of which the original coordinate information on the second coordinate axis is the same, sort the points of which the original coordinate information on the second coordinate axis is the same according to the sizes of the original coordinate information of the points on the third coordinate axis, to obtain the first order of the point cloud.

In some embodiments, if the target sorting method includes the second sorting method, sorting the points in the point cloud according to the second sorting method to obtain the second order of the point cloud in the foregoing operation S603-C includes the following operations S603-C1 to S603-C3:

S603-C1: Determine priorities of coordinate axes. For details, please refer to the foregoing method for determining the priorities of the coordinate axes, which is not be repeated here.

S603-C2: Determine, according to the priorities of the coordinate axes, a codeword corresponding to each point in the point cloud on a space filling curve.

S603-C3: Sort the points in the point cloud according to the size of the codeword corresponding to each point in the point cloud.

The implementation of determining, according to the priorities of the coordinate axes, the codeword corresponding to each point in the point cloud on the space filling curve in the foregoing operation S603-C2 includes but is not limited to the following several methods:

The first method: If the space filling curve is a Morton curve, determine, according to the priorities of the coordinate axes and the coordinate information of each point in the point cloud, a Morton code corresponding to each point in the point cloud on the Morton curve.

The method for determining, according to the priorities of the coordinate axes and the coordinate information of each point in the point cloud, the Morton code corresponding to each point in the point cloud on the Morton curve may refer to related art, which is not repeated here.

In the first method, after the Morton code corresponding to each point in the point cloud is determined, the points in the point cloud are sorted in the order from large to small or from small to large according to the sizes of the Morton codes, to obtain the second order of the point cloud, and the second order may be understood as a Morton order of the point cloud.

The second method: If the space filling curve is a Hilbert curve, determine, according to the priorities of the coordinate axes and the coordinate information of each point in the point cloud, a Hilbert code corresponding to each point in the point cloud on the Hilbert curve.

The method for determining, according to the priorities of the coordinate axes and the coordinate information of each point in the point cloud, the Hilbert code corresponding to each point in the point cloud on the Hilbert curve may refer to related art, which is not repeated here.

In the second method, after the Hilbert code corresponding to each point in the point cloud is determined, the points in the point cloud are sorted in the order from large to small or from small to large according to the sizes of the Hilbert codes, to obtain the second order of the point cloud, and the second order may be understood as a Hilbert order of the point cloud.

The space filling curves involved in some embodiments include but are not limited to the Morton curve and the Hilbert curve mentioned above. In some embodiments, the space filling curve may also be a Z curve, a Peano curve or the like. The type of the space filling curve is not limited thereto.

In some embodiments, if the target sorting method includes the third sorting method, sorting, according to the third sorting method, the points in the point cloud in the foregoing operation S603-A includes:

S603-A1: Determine a starting point for sorting the points in the point cloud.

This starting point may be understood as a first sorting point during sorting, or a first coding point during coding, or a first decoding point during decoding.

The implementation of determining the starting point in the foregoing operation S603-A1 includes but is not limited to the following several methods:

The first method: Determine an origin of a bounding box of the point cloud as the starting point. That is, the point corresponding to the origin of the bounding box of the point cloud is taken as the starting point to sort the points in the point cloud.

The second method: Determine any vertex of a bounding box of a whole point cloud or a partial point cloud as the starting point. That is, the point corresponding to any vertex of the bounding box of the point cloud is taken as the starting point to sort the points in the point cloud. In some embodiments, if the point cloud acquired in the foregoing operation S601 is the whole point cloud, the starting point may be one vertex of the bounding box of the whole point cloud. In some embodiments, if the point cloud acquired in the foregoing operation S601 is the partial point cloud, the starting point may be one vertex of the bounding box of the whole point cloud corresponding to the partial point cloud, and may also be one vertex of the bounding box of the partial point cloud.

The third method: Determine a default coordinate point as the starting point. In some embodiments, determine a coordinate origin as the starting point.

S603-A2: Sort, from the starting point, the points in the point cloud according to the sizes of distances between two points in the point cloud.

The implementation of S603-C2 includes but is not limited to the following several methods:

The first method: Start from the starting point, use the acquired whole point cloud as a search range, search the point closest to the starting point in the whole point cloud according to a target sequence, to be connected to the starting point as a child node of the starting point, use the child node as a new starting point, search the child node of the new starting point in the whole point cloud and so on, to obtain a sorted point cloud.

The target sequence may be an input sequence of the point cloud, or a first sequence of the point cloud, or a second sequence of the point cloud.

In some embodiments, the point cloud includes 100,000 points. Starting from a starting point 1, the distances between the points and the starting point 1 are calculated according to the target sequence in the whole point cloud, and a point 2 closest to the starting point 1 is connected to the starting point 1 as a child node of the starting point 1. Then, among the points in the point cloud except the starting point 1, a point 3 closest to the point 2 is calculated according to the target sequence, and the point 3 is connected to the point 2 as the child node of the point 2 and so on, until all the points in the point cloud are connected together.

The second method: Divide the acquired point cloud into mutually exclusive subsets according to a target sequence, use the subset as a search range, start from the starting point, sort all points in the first subset according to the distances between two points in the first subset, then use the last point in the first subset as the starting point to sort all points in the second subset according to the distances between two points in the second subset and so on, until all points in the last subset are sorted.

In some embodiments, the point cloud includes 100,000 points. According to the target sequence, 10 subsets are obtained by dividing 10,000 points into a subset. Starting from a starting point 1 of the first subset, a point 2 closest to the starting point 1 is searched in the first subset according to the target sequence, and the point 2 is connected to the starting point as a child node of the starting point 1. Then, a point 3 closest to the point 2 is searched in the first subset according to the target sequence, the point 3 is connected to the point 2 as a child node of the point 2 and so on, until all points in the subset 1 are sorted. Then, the last point in the subset 1 is used as the starting point, and a point closest to the starting point is searched in subset 2 according to the target sequence and so on, until all points in the subset 10 are sorted.

The third method: Use a set with a preset size as a search range, start from the starting point, search the point closest to the starting point in the set according to a target sequence, to be connected to the starting point as a child node of the starting point, select the point from the point cloud according to the target sequence to replace the child node in the set, then use the child node as a new starting point, and search the child node of the new starting point in the set according to the target sequence and so on, until a sorted point cloud is obtained.

In some embodiments, the acquired point cloud includes 100,000 points. According to a target sequence, 10,000 points are first selected as a search range. Starting from the starting point, a point 2 closest to the starting point is searched in this set according to the target sequence, and is connected to the starting point as the child node of the starting point. Then, the point 2 is removed from the search range, a first point is selected from the residual 90,000 points according to the target sequence to be added into the search range. A point 3 closest to the point 2 is searched in the new search range, and the point 2 and the point 3 are connected. Then, the point 3 is removed from the search range, a second point is from the residual 90,000 points according to the target sequence to be added into the search range. Then, a point 4 closest to the point 3 is searched in the new search range, the point 3 and the point 4 are connected and so on, until all points in the point cloud are sorted.

The first sorting method, the second sorting method and the third sorting method are introduced with the specific examples respectively.

In an example, if the target sorting method includes only the third sorting method, the target sequence is the input sequence of the point cloud.

In an example, if the target sorting method includes the first sorting method and the third sorting method, the target sequence is the first order of the point cloud obtained after the point cloud is sorted according to the first sorting method.

In some embodiments, the points in the point cloud are first sorted using the first sorting method to obtain the first order of the point cloud, which may be the input sequence of the point cloud or the sequence of the original coordinate information of the points in the point cloud according to the priorities of the coordinate axes, from large to small or from small to large. Then, the point cloud in the first order is further sorted using the third sorting method, that is, the points in the first order are further sorted according to the distances between two points in the point cloud in the first order, to obtain the final prediction tree.

In an example, if the target sorting method includes the second sorting method and the third sorting method, the target sequence is the second order of the point cloud obtained by sorting the point cloud according to the second sorting method.

In some embodiments, the points in the point cloud are first sorted using the second sorting method, to obtain the second order of the point cloud. In some embodiments, a codeword corresponding to each point in the point cloud on the space filling curve is determined according to the priorities of the coordinate axes, and the points in the point cloud are sorted in the order from large to small or from small to large according to the size of the codeword corresponding to each point in the point cloud, to obtain the second order of the point cloud. Then, the point cloud in the second order is further sorted using the third sorting method, that is, the points in the second order are further sorted according to the distance between two points in the point cloud in the second order, to obtain the final prediction tree.

After the points in the point cloud are sorted according to the foregoing target sorting method to obtain the prediction tree of the point cloud, S604 is executed to code the point cloud.

S604: Determine a residual value of first information of each point in the point cloud according to an arrangement sequence of points in the prediction tree, and code the residual value of the first information of each point in the point cloud, to obtain a first code stream of the point cloud.

The first information includes at least one of geometry information and attribute information.

The prediction tree obtained in some embodiments may be used for coding the geometry information of each point in the point cloud, and may also be used for coding the attribute information of each point in the point cloud.

In an example, a geometry information coding process is to use the difference between the geometry information of the current point and the geometry information of the previous point as the residual value of the geometry information of the current point according to the arrangement sequence of the points in the prediction tree, and code the residual value of the geometry information of the current point and so on, to obtain a geometry code stream of the point cloud. In some embodiments, starting from the starting point, the geometry information of the starting point is coded into the code stream. Then, the difference between the geometry information of the second point and the geometry information of starting point is determined as the residual value of the geometry information of the second point, and the residual value of the geometry information of the second point is coded. Then, the difference between the geometry information of the third point and the geometry information of the second point is determined as the residual value of the geometry information of the third point, and the residual value of the geometry information of the third point is coded and so on, until the residual value of the geometry information of the last point in the prediction tree is coded, so as to obtaining the geometry code stream of the point cloud.

The foregoing example takes the difference between the geometry information of the current point and the geometry information of the previous point as the residual value of the geometry information of the current point. In an example, the residual value of the geometry information of the current point may also be determined by the geometry information of the current point and the geometry information of other point before the current point, which is not limited thereto.

In an example, an attribute information coding process is to use the difference between the attribute information of the current point and the attribute information of the previous point as the residual value of the attribute information of the current point according to the arrangement sequence of the points in the prediction tree, and code the residual value of the attribute information of the current point and so on, to obtain an attribute code stream of the point cloud. In some embodiments, starting from the starting point, the attribute information of the starting point is coded into the code stream. Then, the difference between the attribute information of the second point and the attribute information of the starting point is determined as the residual value of the attribute information of the second point, and the residual value of the attribute information of the second point is coded. Then, the difference between the attribute information of the third point and the attribute information of the second point as the residual value of the attribute information of the third point, and the residual value of the attribute information of the third point is coded and so on, until the residual value of the attribute information of the last point in the prediction tree is coded, so as to obtain the attribute code stream of the point cloud.

The foregoing example takes the difference between the attribute information of the current point and the attribute information of the previous point as the residual value of the attribute information of the current point. In an example, the residual value of the attribute information of the current point may also be determined by the attribute information of the current point and the attribute information of other point before the current point, which is not limited thereto.

Some embodiments use at least one sorting method of the first sorting method, the second sorting method and the third sorting method to sort the points in the point cloud, and the two adjacent points in the obtained prediction tree are not necessarily the points with the minimum distance. In order to further reduce the residual value of the first information of each point in the point cloud, save codewords and improve coding efficiency, the embodiment of this embodiment further includes a process of adjusting the locations of the points in the prediction tree prior to the execution of the foregoing operation S604.

That is, before the foregoing operation S604, some embodiments further includes:

S604-1: Adjust the arrangement sequence of the points in the prediction tree, based on the distance between two adjacent points in the prediction tree.

In an example, the foregoing operation S604-1 includes: Calculate, for each point in the prediction tree, a distance a between the point 1 and an adjacent point 2, calculate distances between the point 1 and the other points in the prediction tree, and if the distance between the point 1 and another point 3 is minimal, exchange the locations of the point 2 and the point 3. Execute the foregoing operations on each point in the prediction tree, to obtain a new prediction tree.

In an example, the foregoing operation S604-1 includes: Randomly select M points from the prediction tree, calculate, for each point in the M points, distances between the point and other points in the prediction tree, and if the distance between the point and a certain point is less than the distance between the point and an adjacent point, exchange the locations of the adjacent point and the certain point in the prediction tree. The M points may be randomly selected from the prediction tree, and may also be equally spaced points in the prediction tree, and the selection method of the M points is not limited thereto.

In an example, as shown in FIG. 7, the foregoing operation S604-1 includes the following operations S604-11 to S604-13.

S604-11: Acquire, for any two pairs of adjacent points in the prediction tree, a first distance between an $i^{th}$ point and an $(i+1)^{th}$ point, and a second distance between a $j^{th}$ point and a $(j+1)^{th}$ point, i and j being positive integers, and i being not equal to j.

S604-12: Acquire a third distance between the $i^{th}$ point and the $j^{th}$ point, and a fourth distance between the $(i+1)^{th}$ point and the $(j+1)^{th}$ point.

S604-13: Exchange the locations of the $(i+1)^{th}$ data point and the $(j+1)^{th}$ data point in the prediction tree, if the sum of the first distance and the second distance is greater than the sum of the third distance and the fourth distance.

In this example, any two pairs of adjacent points may be randomly selected from the prediction tree to execute the foregoing operations.

According to the foregoing operations, the new prediction tree is formed after adjusting the arrangement sequence of the points in the prediction tree. The residual value of the first information of each point in the point cloud is determined based on the arrangement sequence of the points in the new prediction tree, and the residual value of the first information of each point in the point cloud is coded, to obtain the first code stream of the point cloud.

According to the point cloud coding method provided by some embodiments, the target sorting method for the points in the point cloud is determined, the target sorting method including at least one the first sorting method, the second sorting method, and the third sorting method, where the first sorting method is the sorting method based on the original coordinate information of the points, the second sorting method is the sorting method based on the sizes of the codewords corresponding to the points, and the third sorting method is the sorting method based on the sizes of the distances between two points; the points in the point cloud are sorted according to the determined target sorting method, to obtain the prediction tree of the point cloud; and the residual value of the first information of each point in the point cloud is determined according to the arrangement sequence of the points in the prediction tree, and the residual value of the first information of each point in the point cloud is coded, to obtain the first code stream of the point cloud. That is, some embodiments provide the various sorting methods to generate the prediction tree, thereby enriching the generation methods of the prediction tree; and when the point cloud is coded according to the prediction tree generated by the foregoing method, the coding efficiency of the point cloud can be improved, and the whole coding process is simple.

The point cloud coding method provided by some embodiments is described by taking the coder side as the example above. The technical solution of some embodiment introduced below by taking a decoder side as an example in conjunction with FIG. 8.

FIG. 8 is a flowchart of a point cloud decoding method according to some embodiments. An execution subject of this method is a decoding device, and the decoding device is also called a decoder. As shown in FIG. 8, the method includes:

S801: Decode a first code stream of a point cloud, to obtain a residual value of first information of each point in the point cloud.

The first information includes at least one of geometry information and attribute information.

In an example, if the first information is the geometry information, the first code stream is a geometry code stream.

In an example, if the first information is the attribute information, the first code stream is an attribute code stream.

In an example, if the first information includes the geometry information and the attribute information, the first code stream includes a geometry code stream and an attribute code stream.

In some embodiments, the geometry code stream and the attribute code stream may be separately decoded, and the geometry code stream and the attribute code stream may also be decoded in parallel.

The first code stream of the point cloud is obtained by coding the residual value of the first information of each point in the point cloud based on an arrangement sequence of the points in a prediction tree. The prediction tree of the point cloud is obtained by sorting the points in the point cloud according to a target sorting method. The target sorting method includes at least one of a first sorting method, a second sorting method and a third sorting method, the first sorting method being a sorting method based on original coordinate information of the points, the second sorting method being a sorting method based on the sizes of codewords corresponding to the points, and the third sorting method being a sorting method based on the sizes of distances between two points.

In an example, if the target sorting method is any one of the first sorting method, the second sorting method and the third sorting method, the foregoing prediction tree is obtained by sorting the points in the point cloud according to any one of the first sorting method, the second sorting method and the third sorting method.

In an example, if the target sorting method includes the first sorting method and the third sorting method, the foregoing prediction tree is obtained by sorting the points in the point cloud according to the first sorting method to obtain a first order of the point cloud, and further sorting the point cloud in the first order according to the third sorting method.

In an example, if the target sorting method includes the second sorting method and the third sorting method, the foregoing prediction tree is obtained by sorting the points in the point cloud according to the second sorting method to obtain a second order of the point cloud, and further sorting the point cloud in the second order according to the third sorting method.

In some embodiments, if the target sorting method includes the first sorting method, the first order is an input sequence of the points in the point cloud.

In some embodiments, if the target sorting method includes the first sorting method, the first order of the point cloud is obtained by sorting the points in the point cloud according to determined priorities of coordinate axes and the original coordinate information of each point in the point cloud.

In some embodiments, the priorities of coordinate axes are default priorities.

In some embodiments, the priorities of the coordinate axes are that the priorities of the first coordinate axis, the second coordinate axis and the third coordinate axis are the same.

In some embodiments, the priorities of coordinate axes are priorities specified by a coding device.

In some embodiments, the priorities of the coordinate axes are determined according to data distribution density of each point in the point cloud on each coordinate axis.

In some embodiments, if the priorities of the coordinate axes from large to small are the first coordinate axis, the second coordinate axis and the third coordinate axis in sequence, the second order of the foregoing point cloud is obtained by sorting the points in the point cloud according to the sizes of the original coordinate information of the points on the first coordinate axis, where, for the points of which the original coordinate information on the first coordinate axis is the same, the points of which the original coordinate information on the first coordinate axis is the same are sorted according to the sizes of the original coordinate information of the points on the second coordinate axis; and for the points of which the original coordinate information on the second coordinate axis is the same, the points of which the original coordinate information on the second coordinate axis is the same are sorted according to the sizes of the original coordinate information of the points on the third coordinate axis.

In some embodiments, if the target sorting method includes the second sorting method, the second order of the point cloud is obtained by determining, according to the determined priorities of the coordinate axes, a codeword corresponding to each point in the point cloud on a space filling curve; and sorting the points in the point cloud according to the size of the codeword corresponding to each point in the point cloud.

In some embodiments, if the space filling curve is a Morton curve, the codeword corresponding to each point in the point cloud on the space filling curve is a Morton code corresponding to each point in the point cloud, determined on the Morton curve according to the priorities of the coordinate axes and the coordinate information of each point in the point cloud.

In some embodiments, if the space filling curve is a Hilbert curve, the codeword corresponding to each point in the point cloud on the space filling curve is a Hilbert code corresponding to each point in the point cloud, determined on the Hilbert curve according to the priorities of the coordinate axes and the coordinate information of each point in the point cloud.

In some embodiments, if the target sorting method includes the third sorting method, a third order of the point cloud is obtained by sorting, from a starting point, the points in the point cloud according to the sizes of distances between two points in the point cloud.

For details of each foregoing sorting method, refer to the related description of the foregoing coder side, which is not repeated here.

In some embodiments, the prediction tree is obtained by adjusting the arrangement sequence of the points in the prediction tree based on the distances between two adjacent points in the prediction tree. In some embodiments, for any two pairs of adjacent points in the prediction tree, a first distance between an $i^{th}$ point and an $(i+1)^{th}$ point is acquired, and a second distance between a $j^{th}$ point and a $(j+1)^{th}$ point is acquired, i and j being positive integers, and i being not equal to j. A third distance between the $i^{th}$ point and the $j^{th}$ point is acquired, and a fourth distance between the $(i+1)^{th}$ point and the $(j+1)^{th}$ point is acquired. If the sum of the first distance and the second distance is greater than the sum of the third distance and the fourth distance, the locations of the $(i+1)^{th}$ data point and the $(j+1)^{th}$ point in the prediction tree are exchanged.

S802: Acquire the first information of a starting point in the prediction tree.

The starting point may be an origin of a bounding box of the point cloud, or the starting point is a default coordinate point (in some embodiments, a coordinate origin), or the starting point may be any vertex of a bounding box of a whole point cloud or a partial point cloud.

Acquiring the first information of the starting point in the prediction tree in the foregoing operation S802 includes but is not limited to the following several methods:

The first method: Determine default first information as the first information of the starting point. In some embodiments, location information of the starting point is a default location.

The second method: Parse header information of the code stream, to obtain the first information of the starting point. In some embodiments, the coder side carries the first information of the starting point in the header information of the code stream, and sends the same to the decoder side.

The third method: Acquire the first information of the starting point based on a point cloud division method. In some embodiments, if the point cloud division method is based on an octree, the point cloud is a bounding box of a corresponding node of the octree, and one vertex of the bounding box of the node is used as the starting point.

S803: Sequentially decode, according to the arrangement sequence of the points in the point cloud in the prediction tree, each point in the point cloud based on the first information of the starting point and the residual value of the first information of each point in the point cloud, to obtain a reconstruction value of the first information of the point cloud.

In some embodiment, the foregoing operation S803 includes the following operation:

S803-A1: Determine, for the current point in the point cloud, the reconstruction value of the first information of a previous point of the current point in the prediction tree, the reconstruction value of the first information of the previous point being determined based on the first information of the starting point and the residual value of the first information of the previous point.

S803-A2: Obtain the reconstruction value of the first information of the current point according to the reconstruction value of the first information of the previous point of the current point and the residual value of the first information of the current point.

In some embodiments, decoding is performed from the starting point in the prediction tree, to obtain the first information of the starting point. The code stream is decoded to obtain the residual value of the first information of the second point in the prediction tree, and the sum of the residual value of the first information of the second point and the first information of the starting point is used as the reconstruction value of the first information of the second point. Then, the code stream is decoded to obtain the residual value of the first information of the third point, and the sum of the residual value of the first information of the third point and the reconstruction value of the first information of the second point is used as the reconstruction value of the first information of the third point. The rest can be done in the same manner, until the last point is decoded.

The foregoing decoding process may further include some operations such as inverse quantization and coordinate transformation. For details, refer to the descriptions of related art, which is not repeated here.

The point cloud decoding method is an inverse process of the foregoing point cloud coding method. The operations in the point cloud decoding method may refer to the corresponding operations in the point cloud coding method, and are not repeated here to avoid duplication.

Some embodiments are described in detail above with reference to the accompanying drawings. However, the embodiments are not limited to the specific details herein, a plurality of simple deformations may be made to the technical solution the disclosure within a range of the technical concept of the disclosure, and these simple deformations fall within the protection scope of the disclosure. In some embodiments, the specific technical features described may be combined in any proper manner in a case without conflict. In order to avoid unnecessary repetition, the various possible combinations are not explained separately herein. Embodiments may also be arbitrarily combined without departing from the idea of the disclosure, and these combinations shall still be regarded as content disclosed herein.

In various embodiments, an order of sequence numbers of the foregoing processes does not indicate an execution sequence, and execution sequences of the processes are to be determined according to functions and internal logics thereof and are not to impose any limitation on an implementation of some embodiments.

Some method embodiments are described in detail above in connection with FIG. 1 to FIG. 8, and some apparatus embodiments are described in detail below in connection with FIG. 9 to FIG. 11.

Figure 9:
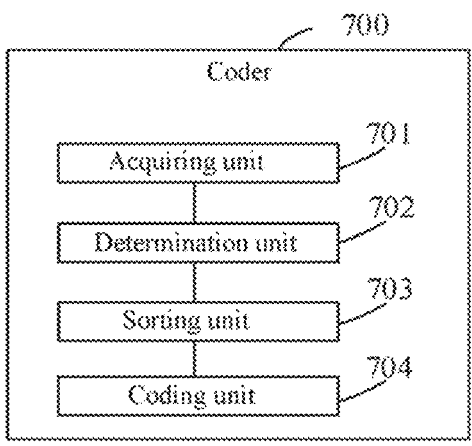
FIG. 9 is a schematic block diagram of a coder according to some embodiments.

FIG. 9 is a schematic block diagram of a coder according to some embodiments.

As shown in FIG. 9, the coder 700 may include:

an acquiring unit 701, configured to acquire a point cloud, the point cloud including a plurality of points;

a determination unit 702, configured to determine a target sorting method for each point in the point cloud, the target sorting method including at least one of a first sorting method, a second sorting method and a third sorting method, the first sorting method being a sorting method based on original coordinate information of the points, the second sorting method being a sorting method based on the sizes of codewords corresponding to the points, and the third sorting method being a sorting method based on the sizes of the distances between two points;

a sorting unit 703, configured to sort the points in the point cloud according to the target sorting method, to obtain a prediction tree of the point cloud; and a coding unit 704, configured to determine a residual value of first information of each point in the point cloud according to an arrangement sequence of the points in the prediction tree, and code the residual value of the first information of each point in the point cloud, to obtain a first code stream of the point cloud, the first information including at least one of geometry information and attribute information.

In some embodiments, the sorting unit 703 is configured to, if the target sorting method is any one of the first sorting method, the second sorting method and the third sorting method, sort the points in the point cloud according to any one of the first sorting method, the second sorting method and the third sorting method, to obtain the prediction tree of the point cloud; or if the target sorting method includes the first sorting method and the third sorting method, sorting the points in the point cloud according to the first sorting method to obtain a first order of the point cloud, and further sorting the point cloud in the first order according to the third sorting method to obtain the prediction tree of the point cloud; or if the target sorting method includes the second sorting method and the third sorting method, sorting the points in the point cloud according to the second sorting method to obtain a second order of the point cloud, and further sorting the point cloud in the second order according to the third sorting method to obtain the prediction tree of the point cloud.

In some embodiments, if the target sorting method includes the first sorting method, the sorting unit 703 is configured to determine an input sequence of the points in the point cloud as the first order of the point cloud; or, determining priorities of coordinate axes, and sorting the points in the point cloud according to the priorities of the coordinate axes and the original coordinate information of the points in the point cloud, to obtain the first order of the point cloud.

In some embodiments, if the priorities of the coordinate axes from large to small are the first coordinate axis, the second coordinate axis and the third coordinate axis in sequence, the sorting unit 703 is configured to sort the points in the point cloud according to the sizes of the original coordinate information of the points on the first coordinate axis; for the points of which the original coordinate information on the first coordinate axis is the same, sorting the points of which the original coordinate information on the first coordinate axis is the same according to the sizes of the original coordinate information of the points on the second coordinate axis; and for the points of which the original coordinate information on the second coordinate axis is the same, sorting the points of which the original coordinate information on the second coordinate axis is the same according to the sizes of the original coordinate information of the points on the third coordinate axis, to obtain the first order of the point cloud.

In some embodiments, if the target sorting method includes the second sorting method, the sorting unit 703 is configured to determine priorities of coordinate axes; determining a codeword corresponding to each point in the point cloud on a space filling curve according to the priorities of the coordinate axes; sorting the points in the point cloud according to the size of the codeword corresponding to each point in the point cloud, to obtain the second order of the point cloud.

In some embodiments, the sorting unit 703 is configured to, if the space filling curve is a Morton curve, determine a Morton code corresponding to each point in the point cloud on the Morton curve, according to the priorities of the coordinate axes and the coordinate information of each point in the point cloud; or, if the space filling curve is a Hilbert curve, determining a Hilbert code corresponding to each point in the point cloud on the Hilbert curve, according to the priorities of the coordinate axes and the coordinate information of each point in the point cloud.

In some embodiments, the sorting unit 703 is configured to determine default priorities as the priorities of the coordinate axes; or, determining that the priorities of the first coordinate axis, the second coordinate axis, and the third coordinate axis are the same; or, determining priorities specified by a coding device as the priorities of the coordinate axes; or, determining the priorities of the coordinate axes according to data distribution density of each point in the point cloud on each coordinate axis.

In some embodiments, if the target sorting method includes the third sorting method, the sorting unit 703 is configured to determine a starting point for sorting the points in the point cloud; and starting from the starting point, and sorting the points in the point cloud according to distances between two points in the point cloud, to obtain a third order of the point cloud.

In some embodiments, the sorting unit 703 is configured to determine an origin of a bounding box of the point cloud as the starting point; or, determining a default coordinate point as the starting point; or, determining any vertex of a bounding box of a whole point cloud or a partial point cloud as the starting point.

In some embodiments, the sorting unit 703 is configured to start from the starting point, use the whole point cloud as a search range, search the point closest to the starting point in the whole point cloud according to a target sequence, to be connected to the starting point as a child node of the starting point, then use the child node as a new starting point, and search the child node of the new starting point in the while point cloud and so on, to obtain a sorted point cloud; or, divide the point cloud into mutually exclusive subsets according to a target sequence, using the subset as a search range, starting from the starting point, sort all points in the first subset according to the distances between two points in the first subset, then use the last point in the first subset as the starting point to sort all points in the second subset according to the distances between two points in the second subset and so on, until all points in the last subset are sorted; or, use a set with a preset size as a search range, start from the starting point, search the point closest to the starting point in the set according to a target sequence, to be connected to the starting point as a child node of the starting point, select one point from the point cloud according to the target sequence to replace the child node in the set, then use the child node as a new starting point, and search the child node of the new starting point in the set according to the target sequence and so on, to obtain a sorted point cloud.

In some embodiments, if the target sorting method only includes the third sorting method, the target sequence is the input sequence of the point cloud; or

- if the target sorting method includes the first sorting method and the third sorting method, the target sequence is the first order of the point cloud obtained by sorting the point cloud according to the first sorting method; or
- if the target sorting method includes the second sorting method and the third sorting method, the target sequence is the second order of the point cloud obtained by sorting the point cloud according to the second sorting method.

In some embodiments, the sorting unit 703 is further configured to adjust the arrangement sequence of the points in the prediction tree based on the distances between two adjacent points in the prediction tree.

In some embodiments, the sorting unit 703 is configured to acquire, for any two pairs of adjacent points in the prediction tree, a first distance between an $i^{th}$ point and an $(i+1)^{th}$ point, and a second distance between a $j^{th}$ point and a $(j+1)^{th}$ point, i and j being positive integers, and i being not equal to j; acquire a third distance between the $i^{th}$ point and the $i^{th}$ point, and a fourth distance between the $(i+1)^{th}$ point and the $(j+1)^{th}$ point; and exchange the locations of the $(i+1)^{th}$ data point and the $(j+1)^{th}$ point in the prediction tree, if the sum of the first distance and the second distance is greater than the sum of the third distance and the fourth distance.

The apparatus embodiment and the method embodiment may correspond to each other, and similar descriptions may refer to the method embodiment. In order to avoid repetition, details are not described here. In some embodiments, the apparatus 700 shown in FIG. 9 may execute the embodiment of the foregoing coding method, and the foregoing and other operations and/or functions of modules in the apparatus 700 are for realizing the method embodiment corresponding to the coder, which are not repeated here for brevity.

Figure 10:
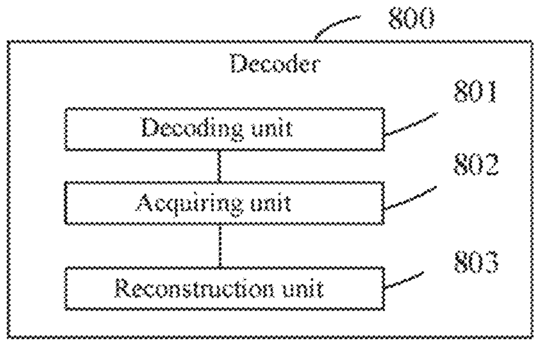
FIG. 10 is a schematic block diagram of a decoder according to some embodiments.

FIG. 10 is a schematic block diagram of a decoder according to some embodiments.

As shown in FIG. 10, a decoder 800 may include:

- a decoding unit 801, configured to decode a first code stream of a point cloud, to obtain a residual value of first information of each point in the point cloud, the first information including at least one of geometry information and attribute information, where the first code stream of the point cloud is obtained by coding the residual value of the first information of each point in the point cloud based on an arrangement sequence of points in a prediction tree of the point cloud, the prediction tree of the point cloud is obtained by sorting the points in the point cloud according to a target sorting method, and the target sorting method includes at least one of a first sorting method, a second sorting method and a third sorting method, the first sorting method being a sorting method based on original coordinate information of the points, the second sorting method being a sorting method based on the sizes of codewords corresponding to the points, and the third sorting method being a sorting method based on the sizes of distances between two points;
- an acquiring unit 802, configured to acquire the first information of a starting point in the prediction tree; and a reconstruction unit 803, configured to sequentially decode, according to the arrangement sequence of the points of the point cloud in the prediction tree, the points in the point cloud based on the first information of the starting point and the residual value of the first information of each point in the point cloud, to obtain a reconstruction value of the first information of the point cloud.

In some embodiments, the reconstruction unit 803 is configured to determine, for the current point in the point cloud, the reconstruction value of the first information of a previous point of the current point in the prediction tree, the reconstruction value of the first information of the previous point being determined based on the first information of the starting point and the residual value of the first information of the previous point; and obtain the reconstruction value of the first information of the current point according to the reconstruction value of the first information of the previous point of the current point and the residual value of the first information of the current point.

In some embodiments, the acquiring unit 802 is configured to determine default first information as the first information of the starting point; or, parse header information of the code stream, to obtain the first information of the starting point; or, acquire the first information of the starting point based on a point cloud division method.

In some embodiments, the starting point may be an origin of a bounding box of the point cloud, or the starting point is a default coordinate point, or the starting point may be any vertex of a bounding box a whole point cloud or a partial point cloud.

In some embodiments, if the target sorting method is any one of the first sorting method, the second sorting method and the third sorting method, the prediction tree is obtained by sorting the points in the point cloud according to the any one of the first sorting method, the second sorting method and the third sorting method; or if the target sorting method includes the first sorting method and the third sorting method, the prediction tree is obtained by sorting the points in the point cloud according to the first sorting method to obtain a first order of the point cloud, and further sorting the point cloud in the first order according to the third sorting method;

or if the target sorting method includes the second sorting method and the third sorting method, the prediction tree is obtained by sorting the points in the point cloud according to the second sorting method to obtain a second order of the point cloud, and further sorting the point cloud in the second order according to the third sorting method.

In some embodiments, if the target sorting method includes the first sorting method, the first order of the point cloud is an input sequence of the points in the point cloud; or the first order of the point cloud is obtained by sorting the points in the point cloud according to determined priorities of coordinate axes and the original coordinate information of each point in the point cloud.

In some embodiments, if the priorities of the coordinate axes from large to small are the first coordinate axis, the second coordinate axis and the third coordinate axis in sequence, the second order of the point cloud is obtained by sorting the points in the point cloud according to the sizes of the original coordinate information of the points on the first coordinate axis; for the points of which the original coordinate information on the first coordinate axis is the same, sorting the points of which the original coordinate information on the first coordinate axis is the same according to the sizes of the original coordinate information of the points on the second coordinate axis; and for the points of which the original coordinate information on the second coordinate axis is the same, sorting the points of which the original coordinate information on the second coordinate axis is the same according to the sizes of the original coordinate information of the points on the third coordinate axis.

In some embodiments, if the starting target sorting method includes the second sorting method, the second order of the point cloud is obtained by determining a codeword corresponding to each point in the point cloud on a space filling curve, according to the determined priorities of the coordinate axes; and sorting the points in the point cloud according to the size of the codeword corresponding to each point in the point cloud.

In some embodiments, if the space filling curve is a Morton curve, the codeword corresponding to each point in the point cloud on the space filling curve is a Morton code corresponding to each point in the point cloud, determined on the Morton curve according to the priorities of the coordinate axes and the coordinate information of each point in the point cloud; or if the pace filling curve is a Hilbert curve, the codeword corresponding to each point in the point cloud on the space filling curve is a Hilbert code corresponding to each point in the point cloud, determined on the Hilbert curve according to the priorities of the coordinate axes and the coordinate information of each point in the point cloud.

In some embodiments, the priorities of the coordinate axes are default priorities; or the priorities of the coordinate axes are that the priorities of the first coordinate axis, the second coordinate axis and the third coordinate axis are the same; or the priorities of coordinate axes are priorities specified by a coding device; or the priorities of the coordinate axes are determined according to data distribution density of each point in the point cloud on each coordinate axis.

In some embodiments, if the target sorting method includes the third sorting method, a third order of the point cloud is obtained by sorting, from the starting point, the points in the point cloud according to the sizes of distances between two points in the point cloud.

In some embodiments, the prediction tree is obtained by adjusting the arrangement sequence of the points in the prediction tree based on the distances between two adjacent points in the prediction tree.

The apparatus embodiment and the method embodiment may correspond to each other, and similar descriptions may refer to the method embodiment. In order to avoid repetition, details are not described here. In some embodiments, the apparatus 800 shown in FIG. 10 may execute the decoding method embodiment, and the foregoing and other operations and/or functions of modules in the apparatus 800 are for realizing the method embodiment corresponding to the decoder, which are not repeated here for brevity.

The apparatus according to some embodiments is described above from the perspective of functional modules, or units, in combination with the accompanying drawings. The functional modules may be realized by hardware, by instructions in the form of software, and by a combination of hardware and software modules. In some embodiments, the operations of some embodiments may be completed by an integrated logic circuit of hardware and/or instructions in the form of software in a processor, and the operations in combination with the method disclosed in some embodiments may be directly executed and completed by hardware in a decoding processor, or by a combination of hardware and software modules in the decoding processor. In some embodiments, the software module may be located in a storage medium that is mature in the art, such as a random access memory, a flash memory, a read-only memory, a programmable, an electrically erasable programmable memory, or a register. The storage medium is located in the memory. The processor reads information in the memory and completes the operations of the method embodiments in combination with hardware thereof.

Figure 11:
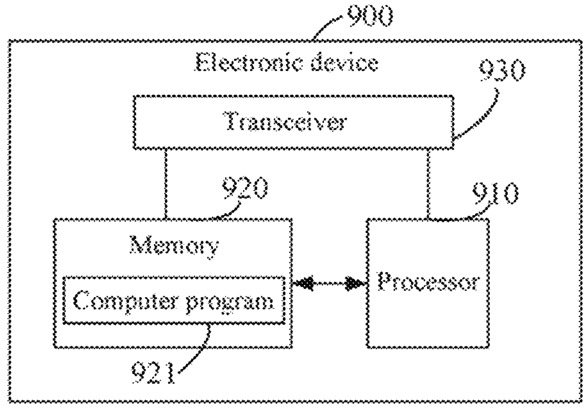
FIG. 11 is a schematic block diagram of an electronic device according to some embodiments.

FIG. 11 is a schematic block diagram of an electronic device 900 provided by some embodiments. The electronic device of FIG. 11 may be the coder or decoder described above, or simultaneously have the functions of the coder and the decoder.

As shown in FIG. 11, the electronic device 900 may include:

a processor 910 and a memory 920, the memory 920 being configured to store a computer program 921 and transmit the computer program 921 to the processor 910. In other words, the processor 910 may call and run the computer program 921 from the memory 920, to implement the methods in some embodiments.

In some embodiments, the processor 910 may be configured to execute the operations of the foregoing method 200 according to instructions in the computer program 921.

In some embodiment, the processor 910 may include but be not limited to:

A general-purpose processor, a digital signal processor (DSP), an application specific integrated circuit (ASIC), a field programmable gate array (FPGA), or other programmable logic devices, discrete gate or transistor logic devices, discrete hardware components, etc.

In some embodiments, the memory 920 includes but is not limited to:

A volatile memory and/or a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through illustrative but not limited description, RAMs in many forms, in some embodiments, a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct Rambus RAM (DR RAM), are available.

In some embodiments, the computer program 921 may be divided into one or more modules, the one or more modules being stored in the memory 920 and executed by the processor 910 to implement methods according to some embodiments. The one or more modules may be a series of computer program instruction segments that can accomplish specific functions, the instruction segments being used for describing the execution process of the computer program 921 in the electronic device 900.

As shown in FIG. 11, the electronic device 900 may further include:

A transceiver 930, the transceiver 930 being able to be connected to the processor 910 and/or memory 920.

The processor 910 may control the transceiver 930 to communicate with other devices, in some embodiments, may transmit information or data to the other devices, or receive the information or data transmitted by the other devices. The transceiver 930 may include a transmitter and a receiver. The transceiver 930 may further include an antenna, and the quantity of the antenna may be one or more.

Components of the electronic device 900 are connected by using a bus system, where in addition to a data bus, the bus system may further include a power bus, a control bus, and a status signal bus.

According to some embodiments, a computer storage medium is provided, storing a computer program, the computer program, when executed by a computer, causing the computer to perform the methods described in the foregoing method embodiments. Some embodiments further provide a computer program product including instructions, the instructions, when run on a computer, causing the computer to perform the methods according to the foregoing method embodiments.

According to some embodiments, a computer program product or a computer program is provided, the computer program product or the computer program including computer instructions that are stored in a computer-readable storage medium. A processor of an electronic device reads the computer instructions from the computer-readable storage medium, the computer instructions, when executed by the processor, causing the electronic device to execute the methods according to the foregoing method embodiments.

In other words, when software is used for implementation, implementation may be entirely or partially performed in the form of a computer program product. The computer program product includes one or more computer instructions. When the computer program instructions are loaded and executed on the computer, all or some of the operations or functions are generated according to some embodiments. The computer may be a general-purpose computer, a special-purpose computer, a computer network, or other programmable apparatus. The computer instructions may be stored in a computer readable storage medium or transmitted from one computer readable storage medium to another computer readable storage medium. In some embodiments, the computer instructions may be transmitted from one website, computer, server or data center to another website, computer, server or data center in a wired (for example, a coaxial cable, an optical fiber or a digital subscriber line (DSL)) or wireless (for example, infrared, wireless or microwave) manner. The computer readable storage medium may be any available medium capable of being accessed by a computer or include one or more data storage devices integrated by an available medium, such as a server and a data center. The available medium may be a magnetic medium (such as a floppy disk, a hard disk, or a magnetic tape), an optical medium (such as a digital video disc (DVD)), a semiconductor medium (such as a solid state disk (SSD)) or the like.

A person of ordinary skill in the art may notice that the modules and algorithm operations described with reference to the embodiments disclosed herein can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions, but it is not to be considered that the implementation goes beyond the scope.

In some embodiments, it is to be understood that the disclosed system, apparatus, and method may be implemented in other manners. In some embodiments, the foregoing described apparatus embodiments are merely exemplary. In some embodiments, the module division is merely logical function division and may be other division in some embodiments. In some embodiments, a plurality of modules or components may be combined or integrated into another system, or some features may be ignored or not performed. In some embodiments, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and the parts displayed as modules may or may not be physical modules, may be located in one position, or may be distributed on a plurality of network modules. Some or all of the modules may be selected according to actual needs to achieve the objectives of the solutions of some embodiments. In addition, functional modules in some embodiments may be integrated into one processing module, or each of the modules may exist alone physically, or two or more modules are integrated into one module.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and reflected in the appended claims.

What is claimed is:

1. A point cloud data decoding method, performed by a computer device, the point cloud data decoding method comprising:

decoding a first code stream of a point cloud, to obtain a residual value of first information of each point in the point cloud, the first information comprising at least one of geometry information and attribute information, wherein the first code stream of the point cloud is obtained by coding the residual value of the first information of each point in the point cloud based on an arrangement sequence of points in a prediction tree, the prediction tree of the point cloud is obtained by sorting the points in the point cloud according to a target sorting method, the target sorting method comprises at least two of a first sorting method, a second sorting method and a third sorting method, the first sorting method being a sorting method based on original coordinate information of the points, the second sorting method being a sorting method based on sizes of codewords corresponding to the points, and the third sorting method being a sorting method based on the sizes of distances between two points, and the target sorting method sequentially applies the at least two sorting methods such that a first method of the at least two sorting methods is applied to the point cloud, and a second method of the at least two sorting methods is applied to an output of the first method to produce the prediction tree;

acquiring the first information of a starting point in the prediction tree; and sequentially decoding, according to the arrangement sequence of the points of the point cloud in the prediction tree, the points in the point cloud based on the first information of the starting point and the residual value of the first information of each point in the point cloud, to obtain a reconstruction value of the first information of the point cloud.

2. The point cloud data decoding method according to claim 1, wherein the sequentially decoding comprises:

determining, for a current point in the point cloud, the reconstruction value of the first information of a previous point of the current point in the prediction tree, the reconstruction value of the first information of the previous point being determined based on the first information of the starting point and the residual value of the first information of the previous point; and obtaining the reconstruction value of the first information of the current point according to the reconstruction value of the first information of the previous point of the current point and the residual value of the first information of the current point.

3. The point cloud data decoding method according to claim 1, wherein the acquiring comprises:

determining default first information as the first information of the starting point; or parsing header information of the first code stream to obtain the first information of the starting point; or acquiring the first information of the starting point based on a point cloud division method.

4. The point cloud data decoding method according to claim 1, wherein the starting point is an origin of a bounding box of the point cloud, or the starting point is a default coordinate point, or the starting point is any vertex of a bounding box of a whole point cloud or a partial point cloud.

5. The point cloud data decoding method according to claim 1, wherein when the target sorting method is any one of the first sorting method, the second sorting method and the third sorting method, the prediction tree is obtained by sorting the points in the point cloud according to the any one of the first sorting method, the second sorting method and the third sorting method;

when the target sorting method comprises the first sorting method and the third sorting method, the prediction tree is obtained by sorting the points in the point cloud according to the first sorting method to obtain a first order of the point cloud, and further sorting the point cloud in the first order according to the third sorting method; and when the target sorting method comprises the second sorting method and the third sorting method, the prediction tree is obtained by sorting the points in the point cloud according to the second sorting method to obtain a second order of the point cloud, and further sorting the point cloud in the second order according to the third sorting method.

6. The point cloud data decoding method according claim 1, wherein when the target sorting method comprises at least the first sorting method, a first order of the point cloud is an input sequence of the points in the point cloud; or the first order of the point cloud is obtained by sorting the points in the point cloud according to determined priorities of coordinate axes and the original coordinate information of each point in the point cloud.

7. The point cloud data decoding method according to claim 6, wherein when the priorities of the coordinate axes from large to small are a first coordinate axis, a second coordinate axis, and a third coordinate axis in sequence, a second order of the point cloud is obtained by sorting the points in the point cloud according to the sizes of the original coordinate information of the points on the first coordinate axis;

for the points of which the original coordinate information on the first coordinate axis is the same, sorting the points of which the original coordinate information on the first coordinate axis is the same according to the sizes of the original coordinate information of the points on the second coordinate axis; and for the points of which the original coordinate information on the second coordinate axis is the same, sorting the points of which the original coordinate information on the second coordinate axis is the same according to the sizes of the original coordinate information of the points on the third coordinate axis.

8. The point cloud data decoding method according to claim 6, wherein when a starting target sorting method comprises at least the second sorting method, a second order of the point cloud is obtained by determining a codeword corresponding to each point in the point cloud on a space filling curve, according to the determined priorities of the coordinate axes, and sorting the points in the point cloud according to the size of the codeword corresponding to each point in the point cloud.

9. The point cloud data decoding method according to claim 8, wherein when the space filling curve is a Morton curve, the codeword corresponding to each point in the point cloud on the space filling curve is a Morton code corresponding to each point in the point cloud, determined on the Morton curve according to the priorities of the coordinate axes and the original coordinate information of each point in the point cloud; and when the space filling curve is a Hilbert curve, the codeword corresponding to each point in the point cloud on the space filling curve is a Hilbert code corresponding to each point in the point cloud, determined on the Hilbert curve according to the priorities of the coordinate axes and the original coordinate information of each point in the point cloud.

10. The point cloud data decoding method according to claim 6, wherein the priorities of the coordinate axes are default priorities; or the priorities of the coordinate axes are that the priorities of a first coordinate axis, a second coordinate axis and a third coordinate axis are the same; or the priorities of coordinate axes are priorities specified by a coding device; or the priorities of the coordinate axes are determined according to data distribution density of each point in the point cloud on each coordinate axis.

11. The point cloud data decoding method according to claim 1, wherein when the target sorting method comprises the third sorting method, a third order of the point cloud is obtained by sorting, from the starting point, the points in the point cloud according to the sizes of distances between two points in the point cloud.

12. The point cloud data decoding method according to claim 1, wherein the prediction tree is obtained by adjusting the arrangement sequence of the points in the prediction tree based on distances between two adjacent points in the prediction tree.

13. A point cloud data decoding apparatus, comprising:

at least one memory configured to store program code; and at least one processor configured to access the at least one memory and operate according to the program code, the program code comprising:

decoding code configured to cause at least one of the at least one processor to decode a first code stream of a point cloud, to obtain a residual value of first information of each point in the point cloud, the first information comprising at least one of geometry information and attribute information, wherein the first code stream of the point cloud is obtained by coding the residual value of the first information of each point in the point cloud based on an arrangement sequence of points in a prediction tree of the point cloud, the prediction tree of the point cloud is obtained by sorting the points in the point cloud according to a target sorting method, the target sorting method comprises at least two of a first sorting method, a second sorting method and a third sorting method, the first sorting method being a sorting method based on original coordinate information of the points, the second sorting method being a sorting method based on the sizes of codewords corresponding to the points, and the third sorting method being a sorting method based on the sizes of distances between two points, and the target sorting method sequentially applies the at least two sorting methods such that a first method of the at least two sorting methods is applied to the point cloud, and a second method of the at least two sorting methods is applied to an output of the first method to produce the prediction tree;

acquiring code configured to cause at least one of the at least one processor to acquire the first information of a starting point in the prediction tree; and reconstruction code configured to cause at least one of the at least one processor to sequentially decode, according to the arrangement sequence of the points of the point cloud in the prediction tree, the points in the point cloud based on the first information of the starting point and the residual value of the first information of each point in the point cloud, to obtain a reconstruction value of the first information of the point cloud.

14. The point cloud data decoding apparatus according to claim 13, wherein the reconstruction code is further configured to cause at least one of the at least one processor to:

determine, for a current point in the point cloud, the reconstruction value of the first information of a previous point of the current point in the prediction tree, the reconstruction value of the first information of the previous point being determined based on the first information of the starting point and the residual value of the first information of the previous point; and obtain the reconstruction value of the first information of the current point according to the reconstruction value of the first information of the previous point of the current point and the residual value of the first information of the current point.

15. The point cloud data decoding apparatus according to claim 13, wherein the acquisition code is further configured to cause at least one of the at least one processor to:

determine default first information as the first information of the starting point; or parse header information of the first code stream to obtain the first information of the starting point; or acquire the first information of the starting point based on a point cloud division method.

16. The point cloud data decoding apparatus according to claim 13, wherein the starting point is an origin of a bounding box of the point cloud, or the starting point is a default coordinate point, or the starting point is any vertex of a bounding box of a whole point cloud or a partial point cloud.

17. The point cloud data decoding apparatus according to claim 13, wherein when the target sorting method is any one of the first sorting method, the second sorting method and the third sorting method, the prediction tree is obtained by sorting the points in the point cloud according to the any one of the first sorting method, the second sorting method and the third sorting method;

when the target sorting method comprises the first sorting method and the third sorting method, the prediction tree is obtained by sorting the points in the point cloud according to the first sorting method to obtain a first order of the point cloud, and further sorting the point cloud in the first order according to the third sorting method;

and when the target sorting method comprises the second sorting method and the third sorting method, the prediction tree is obtained by sorting the points in the point cloud according to the second sorting method to obtain a second order of the point cloud, and further sorting the point cloud in the second order according to the third sorting method.

18. The point cloud data decoding apparatus according claim 13, wherein when the target sorting method comprises the first sorting method, a first order of the point cloud is an input sequence of the points in the point cloud; or the first order of the point cloud is obtained by sorting the points in the point cloud according to determined priorities of coordinate axes and the original coordinate information of each point in the point cloud.

19. The point cloud data decoding apparatus according to claim 18, wherein when the priorities of the coordinate axes from large to small are a first coordinate axis, a second coordinate axis, and a third coordinate axis in sequence, a second order of the point cloud is obtained by sorting the points in the point cloud according to the sizes of the original coordinate information of the points on the first coordinate axis;

for the points of which the original coordinate information on the first coordinate axis is the same, sorting the points of which the original coordinate information on the first coordinate axis is the same according to the sizes of the original coordinate information of the points on the second coordinate axis; and for the points of which the original coordinate information on the second coordinate axis is the same, sorting the points of which the original coordinate information on the second coordinate axis is the same according to the sizes of the original coordinate information of the points on the third coordinate axis.

20. A non-transitory computer-readable storage medium, storing computer code which, when executed by at least one processor, causes the at least one processor to at least:

decode a first code stream of a point cloud, to obtain a residual value of first information of each point in the point cloud, the first information comprising at least one of geometry information and attribute information, wherein the first code stream of the point cloud is obtained by coding the residual value of the first information of each point in the point cloud based on an arrangement sequence of points in a prediction tree, the prediction tree of the point cloud is obtained by sorting the points in the point cloud according to a target sorting method, the target sorting method comprises at least two of a first sorting method, a second sorting method and a third sorting method, the first sorting method being a sorting method based on original coordinate information of the points, the second sorting method being a sorting method based on sizes of codewords corresponding to the points, and the third sorting method being a sorting method based on the sizes of distances between two points, and the target sorting method sequentially applies the at least two sorting methods such that a first method of the at least two sorting methods is applied to the point cloud, and a second method of the at least two sorting methods is applied to an output of the first method to produce the prediction tree;

acquire the first information of a starting point in the prediction tree; and sequentially decode, according to the arrangement sequence of the points of the point cloud in the prediction tree, the points in the point cloud based on the first information of the starting point and the residual value of the first information of each point in the point cloud, to obtain a reconstruction value of the first information of the point cloud.

* * * * *